United States Patent
Swaine

(10) Patent No.: US 7,093,108 B2
(45) Date of Patent: Aug. 15, 2006

(54) APPARATUS AND METHOD FOR EFFICIENTLY INCORPORATING INSTRUCTION SET INFORMATION WITH INSTRUCTION ADDRESSES

(75) Inventor: Andrew B. Swaine, Welwyn Garden (GB)

(73) Assignee: ARM Limited, Cambridge (GB)

( * ) Notice: Subject to any disclaimer, the term of this patent is extended or adjusted under 35 U.S.C. 154(b) by 927 days.

(21) Appl. No.: 09/876,220

(22) Filed: Jun. 8, 2001

(65) Prior Publication Data

US 2002/0161989 A1 Oct. 31, 2002

Related U.S. Application Data

(63) Continuation-in-part of application No. 09/792,643, filed on Feb. 26, 2001, now Pat. No. 7,020,768, which is a continuation-in-part of application No. 09/773,387, filed on Feb. 1, 2001.

(51) Int. Cl.
*G06F 9/00* (2006.01)
*G06F 11/00* (2006.01)
(52) U.S. Cl. .................. 712/227; 712/209; 714/45
(58) Field of Classification Search ............ 712/209, 712/227; 714/50, 45, 38
See application file for complete search history.

U.S. PATENT DOCUMENTS 4,439,827 A 3/1984 Wilkes (Continued)

FOREIGN PATENT DOCUMENTS

EP 0 324 308 7/1989

(Continued)

OTHER PUBLICATIONS

ARM966E-S Technical Reference Manual, Dec. 1999, Arm Limited, Issue A, Chapter 1.

(Continued)

*Primary Examiner*—Eddie Chan
*Assistant Examiner*—Kevin P. Rizzuto
(74) *Attorney, Agent, or Firm*—Nixon & Vanderhye P.C.

(57) ABSTRACT

The present invention provides an apparatus and method for storing instruction set information. The apparatus comprises a processing circuit for executing processing instructions from any of a plurality of instruction sets of processing instructions, each processing instruction being specified by an instruction address identifying that processing instruction's location in memory. A different number of instruction address bits need to be specified in the instruction address for processing instructions in different instruction sets. The apparatus further comprises encoding logic for encoding an instruction address with an indication of the instruction set corresponding to that instruction to generate an n-bit encoded instruction address. The encoding logic is arranged to perform the encoding by performing a computation equivalent to extending the specified instruction address bits to n-bits by prepending a pattern of bits to the specified instruction address bits, the pattern of bits prepended being dependent on the instruction set corresponding to that instruction. Preferably, the encoded instruction address is then compressed. This approach provides a particularly efficient technique for incorporating instruction set information with instruction addresses, and will be useful in any implementations where it is desired to track such information, one example being in tracing mechanisms used to trace the activity of a processing circuit.

22 Claims, 5 Drawing Sheets

U.S. PATENT DOCUMENTS

| | | | |
|---|---|---|---|
| 4,590,550 A | 5/1986 | Eilert | |
| 4,821,178 A | 4/1989 | Levin et al. | |
| 5,151,981 A | 9/1992 | Westcott et al. | |
| 5,347,647 A | 9/1994 | Allt et al. | |
| 5,550,974 A | 8/1996 | Pennington et al. | |
| 5,555,392 A | 9/1996 | Chaput et al. | |
| 5,781,750 A * | 7/1998 | Blomgren et al. | 712/209 |
| 5,802,273 A | 9/1998 | Levine et al. | |
| 5,923,872 A | 7/1999 | Chrysos et al. | |
| 5,978,742 A | 11/1999 | Pickerd | |
| 5,987,598 A | 11/1999 | Levine | |
| 6,000,044 A | 12/1999 | Chrysos et al. | |
| 6,009,270 A | 12/1999 | Mann | |
| 6,035,422 A | 3/2000 | Hohl et al. | |
| 6,052,802 A | 4/2000 | Zahir et al. | |
| 6,067,644 A | 5/2000 | Levine et al. | |
| 6,134,652 A | 10/2000 | Warren | |
| 6,139,198 A | 10/2000 | Danforth et al. | |
| 6,175,913 B1 | 1/2001 | Chesters | |
| 6,374,367 B1 | 4/2002 | Dean et al. | |
| 6,415,378 B1 | 7/2002 | Davidson et al. | |
| 6,539,502 B1 | 3/2003 | Davidson et al. | |
| 6,574,727 B1 | 6/2003 | Davidson et al. | |

FOREIGN PATENT DOCUMENTS

| | | |
|---|---|---|
| EP | 0 465 765 | 1/1992 |
| EP | 0 503 514 | 9/1992 |
| EP | 0 689 141 | 12/1995 |
| EP | 0 919 919 | 6/1999 |
| GB | 2 307 072 | 5/1997 |
| JP | 62-40538 | 2/1987 |
| JP | 6019742 | 1/1994 |
| JP | 8044557 | 2/1996 |
| JP | 11259335 | 4/1999 |

OTHER PUBLICATIONS

Embedded Trace Macrocell Architecture Specification, Dec. 2002, Arm Limited, Issue 1, Chapters 1 and 2 and Appendix B.

Uhlig et al., Trace-Driven Memory Simulation: A Survey, Jun. 1997, ACM Computing Surveys, vol. 29, No. 2, pp. 128-170.

ARM IHI 0014 Revision C—Embedded Trace Macrocell Specification.

ARM DDI 0157F—ETM9 (Rev. 1) Technical Reference Manual.

ARM DDI 0158D-ETM7 (Rev. 1) Technical Reference Manual.

U.S. Appl. No. 09/773,387, filed Feb. 1, 2001.

ARM IHI 0014 Revision I-Embedded Trace Macrocell Spec.

U.S. Appl. No. 09/792,643, filed Feb. 26, 2001.

Computer Organization and Design, The Hardware/Software Interface, J. Hennessy et al., Morgan Kaufmann Publishers, Inc., Second Edition, p. 351.

* cited by examiner

APPARATUS AND METHOD FOR EFFICIENTLY INCORPORATING INSTRUCTION SET INFORMATION WITH INSTRUCTION ADDRESSES

This application is a continuation-in-part of application Ser. No. 09/792,643, filed Feb. 26, 2001 now U.S. Pat. No. 7,020,768 which in turn is a continuation-in-part of application Ser. No. 09/773,387, filed Feb. 1, 2001 the entire content of which is hereby incorporated by reference in this application.

BACKGROUND OF THE INVENTION

1. Field of the Invention

The present invention relates to data processing apparatus. More particularly, the invention relates to a data processing apparatus and method for storing instruction set information.

2. Description of the Prior Art

Data processing apparatus may be provided with processing circuits that are able to execute processing instructions from a number of different instruction sets. There are a number of situations where it is desirable to keep track of the processing being performed by the processing circuit, and in such situations it may be desirable to be able to identify at any point in time which instruction set is being used. For example, such information is useful during the development of data processing systems, where it is often desirable to track the activity of the processing circuit. An example of a tool that may be used to assist in such a process is a tracing tool.

Tracing the activity of a data processing system whereby a trace stream is generated including data representing the step-by-step activity within the system is a highly useful tool in system development. However, with the general move towards more deeply embedded processor cores, it becomes more difficult to track the state of the processor core via externally accessible pins. Accordingly, as well as off-chip tracing mechanisms for capturing and analysing trace data, increased amounts of tracing functionality are being placed on-chip. Examples of such on-chip tracing mechanisms are the Embedded Trace Macrocell provided by ARM Limited, Cambridge, England in association with their ARM7 and ARM9 processors.

Such tracing mechanisms produce in real time a trace stream of data representing activities of the data processing system that are desired to be traced. This trace stream can then subsequently be used to facilitate debugging of sequences of processing instructions being executed by the data processing system.

It is known to provide tracing and debugging mechanisms incorporating trigger points that serve to control the tracing and debugging operation, such as starting or stopping tracing upon access to a particular register, address or data value. Such mechanisms are very useful for diagnosing specific parts of a system or types of behaviour. As an example, if a particular system bug is associated with exception behaviour, then tracing the full operation of the system would produce an inconveniently large volume of data when what is really required is tracing of the exception behaviour with this being triggered upon access to the appropriate exception handling vector.

As data processing systems increase in complexity whilst it is desired to also reduce development time for new systems, there is a need to improve the debug and tracing tools and mechanisms that may be used within the development of data processing systems.

In situations where the processing circuit may be able to execute processing instructions from any of a number of different instruction sets, then it would be desirable for tracing mechanisms to also keep track of that instruction set information. However, it is also desirable wherever possible to reduce the amount of data that needs to be traced.

Accordingly, it is an object of the present invention to provide an efficient technique for storing such instruction set information.

SUMMARY OF THE INVENTION

Viewed from a first aspect, the present invention provides apparatus for processing data, said apparatus comprising: a processing circuit for executing processing instructions from any of a plurality of instruction sets of processing instructions, each processing instruction being specified by an instruction address identifying that processing instruction's location in memory, a different number of instruction address bits needing to be specified in the instruction address for processing instructions in different instruction sets; and encoding logic for encoding an instruction address with an indication of the instruction set corresponding to that instruction to generate an n-bit encoded instruction address, the encoding logic being arranged to perform the encoding by performing a computation equivalent to extending the specified instruction address bits to n-bits by prepending a pattern of bits to the specified instruction address bits, the pattern of bits prepended being dependent on the instruction set corresponding to that instruction.

In accordance with the present invention, it has been realised that in situations where a plurality of instruction sets may be used by the processing circuit, it is often the case that a different number of instruction address bits need to be specified in the instruction address for instructions in different instruction sets. The invention takes advantage of this to enable an efficient encoding of the instruction set information with the instruction address.

More specifically, encoding logic is provided to generate an n-bit encoded instruction address by performing a computation equivalent to extending the specified instruction address bits to n-bits by prepending a pattern of bits to the specified instruction address bits, the pattern of bits prepended being dependent on the instruction set corresponding to that instruction.

As an example, consider the situation where an instruction address is specified by 32 bits. For a first instruction set, an instruction may be able to start at any bit position in the memory, and accordingly all 32 bits need to be specified for instruction addresses relating to that instruction set. However, for a second instruction set, instructions may be constrained to start at only a subset of all available locations in memory, for example every second bit position. Similarly, a third instruction set may have different constraints about where instructions may be located in memory, for example at every fourth bit position. In such situations, it will be clear that one or more of the least significant bits of instruction addresses for instructions in the second and third instruction sets will always have the same value, and hence do not need to be specified. For example, if instructions in the second instruction set may start at every second bit position in memory, and instructions in the third instruction set may start at every fourth bit position in memory, then it is clear that the least significant bit for instruction addresses of the second instruction set may be ignored, and the two least significant bits for instruction addresses of the third instruction set may be ignored. Hence, it is clear that in such situations a different number of instruction address bits need to be specified for the instruction addresses in different instruction sets, even though nominally they may all be represented as 32 bit addresses.

It will be appreciated that there are a number of different ways in which the function of the encoding logic may be performed. For example, each instruction address to be encoded may be right shifted by an appropriate number of bits dependent on the instruction set to which that instruction relates, to isolate only the instruction address bits needing to be specified, with a different pattern of bits then being prepended to the appropriately shifted instruction address to form the n-bit encoded instruction address.

Hence, considering the earlier example where instruction addresses are specified by 32-bits, instructions in the first instruction set require all 32 bits to be specified, instructions in the second instruction set require 31 bits to be specified, and instructions in the third instruction set require 30 bits to be specified, it will be appreciated that instruction addresses relating to the first instruction set will not be right shifted, instruction addresses relating to the second instruction set will be right shifted by one bit, and instruction addresses relating to the third instruction set will be right shifted by two bits. A different pattern of bits can then be pre-pended to the shifted instruction addresses such that the encoded instruction addresses are of the same length. The different pattern of bits in the most significant bit positions of the encoding instruction addresses will then implicitly provide information about the instruction set to which those instruction addresses relate.

It will be appreciated that there need be no correspondence between the different patterns of bits prepended dependent on the instruction set. However, in preferred embodiments, for each instruction set the pattern of bits prepended to the specified instruction address bits of an instruction address from that instruction set is related by a shifted pattern with the pattern of bits prepended to the specified instruction address bits of instruction addresses of different instruction sets. For example, considering the above example of three instruction sets, a bit pattern "1" may be added to instruction addresses of the first instruction set, a bit pattern "01" may be added to instruction addresses of the second instruction set, and a bit pattern "001" may be added to instruction addresses of the third instruction set.

It will be appreciated that any computation equivalent to generating the encoded instruction address as described above may be used. For example, a predetermined pattern of bits may be pre-pended to the specified instruction address bits to form an intermediate value, with n bits then being selected from the intermediate value as the encoded instruction address. It will be apparent that there are a number of different ways in which the n bits to form the encoded instruction address may be selected. For example, if all instruction addresses are represented within the intermediate value by the same number of bits, irrespective of the instruction set to which they relate (i.e. all address bits are included, not just the bits that need to be specified), then a different selection of n bits will be made dependent on the instruction set to which the instruction address relates. For example, considering the earlier example, if the instruction address relates to the third instruction set, where the least two significant bits are irrelevant, then the least significant bit of the n-bits chosen as the encoded instruction address will be bit position two. Alternatively, if only the instruction address bits that need to be specified are used when generating the intermediate value, then it will be apparent that the encoded instruction address will always be formed by selecting the least significant n bits of the intermediate value, irrespective of which instruction set the instruction address relates to.

As described above, the preferred embodiments of the present invention provide a very efficient technique for encoding instruction set information with an instruction address, and hence will be beneficial in any implementations where it is desired to track instruction set information with instruction addresses. Given a general desire to reduce wherever possible the amount of data being tracked, it would be beneficial to provide a technique for even more efficiently representing the encoded instruction address as generated by the present invention.

Accordingly, in preferred embodiments, the apparatus further comprises compression logic for compressing a said encoded instruction address by performing a computation equivalent to partitioning that encoded instruction address into a plurality of x-bit sections, comparing each x-bit section with the corresponding x-bit section of a preceding encoded instruction address and outputting as a compressed encoded instruction address the most significant x-bit section that differs from the corresponding x-bit section of the preceding encoded instruction address, along with any less significant x-bit sections. In preferred embodiments, the least significant x-bit section is always output.

This will typically provide a significant compression of the encoded instruction address, since it is often the case that any particular instruction address differs only slightly from the previous instruction address, and hence a number of the most significant bits of the instruction address are often identical. In accordance with the present invention, the most significant bits of the encoded instruction address implicitly identify the instruction set being used, but since this also changes fairly irregularly, it will be seen that the above described compression technique enables many encoded instruction addresses to be significantly compressed.

Further, it should be noted that because of the way the encoded instruction address is generated, any irrelevant instruction address bits will have been discarded and hence this will assist in improving the efficiency of the compression for any instruction addresses relating to instruction sets where the instruction address bits needing to be specified are less than the total number of instruction address bits provided in the instruction address. Returning to the earlier example, it can be seen that if instruction addresses from instruction set three only need 30 bits to be specified, then the least significant two bits of the instruction address are omitted prior to the compression being applied, and accordingly this assists in increasing the efficiency of the compression technique.

One potential problem with the above described compression technique is determining when each compressed encoded instruction address starts and finishes, since the number of x-bit sections forming each compressed encoded instruction address will vary depending on the extent to which the particular encoded instruction address being compressed is similar to a preceding encoded instruction address.

To solve this potential problem, in preferred embodiments the compression logic is arranged to associate with each x-bit section to be output from the compression logic a flag to indicate whether that x-bit section is the last x-bit section being output as the compressed encoded instruction address. In preferred embodiments, if a plurality of x-bit sections are to be output from the compression logic, the plurality of x-bit sections are output sequentially starting with the least significant x-bit section.

It will be appreciated that the flag may be output as a separate signal to each x-bit section so long as it can be determined which flag relates to which x-bit section. However, in preferred embodiments the compression logic is further arranged to expand to y bits each x-bit section to be output from the compression logic, with the most significant y-x bits containing the flag. Hence, in such preferred embodiments, the flag is actually contained within each output section such that the output from the compression logic is a sequence of y-bit sections with the most significant y-x bits containing the flag.

It will be appreciated that any number of bits may be used to specify the flag. However, in preferred embodiments the flag is a single bit. More particularly, in preferred embodiments, y is 8 and x is 7, such that the compressed encoded instruction address comprises a sequence of 8-bit sections with the most significant bit identifying whether that section is the last section of the compressed encoded instruction address.

It will be appreciated that the encoding logic may take a variety of forms. For example, as mentioned earlier, it may include shifting logic which is responsive to an indication of the instruction set to determine an appropriate right shift, if any, to apply to each input instruction address. A predetermined pattern of bits can then be prepended to the appropriately shifted instruction address, after which the least significant n-bits are output as the encoded instruction address. Given the different right shifting applied dependent on the instruction set, it will be appreciated that a different pattern of bits will exist in the most significant bit positions of the encoded instruction address, dependent on the instruction set to which the instruction address relates.

However, in preferred embodiments, the encoding logic comprises an n-bit selector logic unit for receiving the intermediate value and an identifier signal identifying the instruction set associated with the instruction address contained within the intermediate value, the n-bit selector being arranged to output a predetermined n-bits of the intermediate value dependent on the identifier signal. In such embodiments, it is envisaged that the intermediate value is generated without performing any right shift on the instruction addresses, and that instead an appropriate selection of n-bits from the intermediate value is made dependent on the identifier signal. It will be appreciated that such a process results in generation of the same encoded instruction addresses as would have been generated by performing appropriate right shifting of individual instruction addresses following by outputting of the least significant n-bits.

In preferred embodiments, the compression logic comprises a plurality of comparators, each comparator being arranged to receive a corresponding x-bit section of the encoded instruction address, and including temporary storage for storing the corresponding x-bit section of the preceding encoded instruction address, the comparator being arranged to compare the two x-bit sections and to generate a difference signal which is set when the two x-bit sections are different. In preferred embodiments, the temporary storage takes the form of a register, with a register also being used to store the current x-bit section. The output from the two registers are then compared in order to generate an appropriate difference signal.

Further, in preferred embodiments, the compression logic comprises a flag generator logic arranged to generate for each x-bit section to be output from the compression logic a flag based on predetermined combinations of the difference signals generated by the plurality of comparators, such that a flag for a particular x-bit section is set if a more significant x-bit section is also to be output. Hence, in such embodiments, a flag is set to indicate that a further x-bit section will be following that x-bit section, a flag only remaining unset if the corresponding x-bit section is the last section being output as the compressed encoded instruction address. It will be appreciated that the flag generator logic may be formed by any appropriate interconnection of logic gates. However, in preferred embodiments, a sequence of OR gates are used to ensure that a flag for a particular x-bit section is set if either its corresponding difference signal or the difference signal of a more significant x-bit section is set.

Preferably, the compression logic further comprises an output generator for generating the compressed encoded instruction address by pre-pending to each x-bit section to be output its corresponding flag, thereby generating as the output compressed encoded instruction address a sequence of y-bit sections. It will be appreciated that the output generator may be configured in a variety of ways. However, in preferred embodiments, the function of the output generator is performed directly by appropriate hard wiring of the flags generated by the flag generator logic and the corresponding x-bit sections.

It will be appreciated that the above described encoding logic and compression logic of embodiments of the present invention may be beneficially employed in any implementations where it is desired to track instruction set information with instruction addresses. However, in preferred embodiments, the encoding logic and compression logic are provided within a trace module used to trace activities of the processing circuit.

Hence, in accordance with a second aspect of the present invention, a tracing tool is provided for a data processing apparatus, the data processing apparatus having a processing circuit for executing processing instructions from any of a plurality of instruction sets of processing instructions, each processing instruction being specified by an instruction address identifying that processing instruction's location in memory, a different number of instruction address bits needing to be specified in the instruction address for processing instructions in different instruction sets, and the tracing tool comprising: encoding logic for encoding an instruction address with an indication of the instruction set corresponding to that instruction to generate an n-bit encoded instruction address, the encoding logic being arranged to perform the encoding by performing a computation equivalent to extending the specified instruction address bits to n-bits by prepending a pattern of bits to the specified instruction address bits, the pattern of bits prepended being dependent on the instruction set corresponding to that instruction.

In preferred embodiments, that tracing tool further comprises compression logic for compressing an encoded instruction address by performing a computation equivalent to partitioning the encoded instruction address into a plurality of x-bit sections, comparing each x-bit section with the corresponding x-bit section of a preceding encoded instruction address and outputting as the compressed encoded instruction address the most significant x-bit section that differs from the corresponding x-bit section of the preceding encoded instruction address, along with any less significant x-bit sections.

Viewed from a third aspect, the present invention provides a method of storing instruction set information, a processing circuit being arranged to execute processing instructions from any of a plurality of instruction sets of processing instructions, each processing instruction being specified by an instruction address identifying that processing instruction's location in memory, a different number of instruction address bits needing to be specified in the instruction address for processing instructions in different instruction sets, the method comprising the steps of: encoding an instruction address with an indication of the instruction set corresponding to that instruction to generate an n-bit encoded instruction address, by performing a computation equivalent to: extending the specified instruction address bits to n-bits by prepending a pattern of bits to the specified instruction address bits, the pattern of bits prepended being dependent on the instruction set corresponding to that instruction.

In preferred embodiments of the present invention, the method further comprises the step of compressing a said encoded instruction address by performing a computation equivalent to: (a) partitioning the encoded instruction address into a plurality of x-bit sections; (b) comparing each x-bit section with the corresponding x-bit section of a preceding encoded instruction address; and (c) outputting as the compressed encoded instruction address the most significant x-bit section that differs from the corresponding x-bit section of the preceding encoded instruction address, along with any less significant x-bit sections.

The present invention also relates to a method of decompressing a compressed encoded instruction address generated in accordance with the method of the third aspect of the present invention, by performing a computation equivalent to: (i) determining the number of x-bit sections forming the compressed encoded instruction address; and (ii) extending as necessary the compressed encoded instruction address to n-bits by incorporating additional x-bit sections obtained from corresponding x-bit sections of a preceding encoded instruction address, thereby producing the encoded instruction address.

In preferred embodiments, the method further comprises the step of decoding the encoded instruction address by performing a computation equivalent to determining from the predetermined pattern of bits the instruction set to which the instruction address relates, and removing the predetermined pattern of bits to yield the specified instruction address bits.

Viewed from a fourth aspect, the present invention provides a computer program product carrying a computer program for controlling an apparatus in accordance with the method of the third aspect of the present invention.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

For the purposes of describing a preferred embodiment of the present invention, reference will be made to on-chip tracing techniques, and the tracing of instruction set information with instruction addresses being traced.

Figure 1:
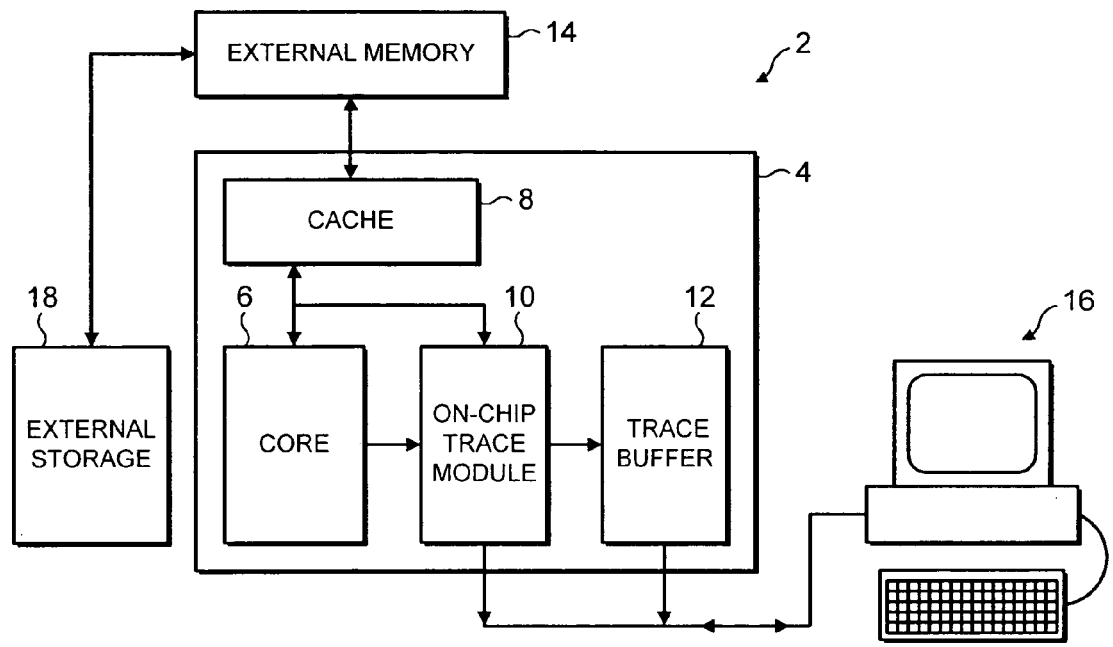
FIG. 1 schematically illustrates a data processing system providing on-chip tracing mechanisms.

FIG. 1 schematically illustrates a data processing system 2 providing an on-chip tracing mechanism. An integrated circuit 4 includes a microprocessor core 6, a cache memory 8, an on-chip trace module controller 10 and an on-chip trace buffer 12. The integrated circuit 4 is connected to an external memory 14 which is accessed when a cache miss occurs within the cache memory 8. A general purpose computer 16 is coupled to the on-chip trace module controller 10 and the on-chip trace buffer 12 and serves to recover and analyse a stream of tracing data from these elements using software executing upon the general purpose computer 16.

It is often the case that the processor core 6 may, during operation, need to access more data processing instructions and data than there is actually space for in the external memory 14. For example, the external memory 14 may have a size of 1 MB, whereas the processor core 6 might typically be able to specify 32-bit addresses, thereby enabling 4 GB of instructions and data to be specified. Accordingly, all of the instructions and data required by the processor core 6 are stored within external storage 18, for example a hard disk, and then when the processor core 6 is to operate in a particular state of operation, the relevant instructions and data for that state of operation are loaded into the external memory 14.

Figure 2:
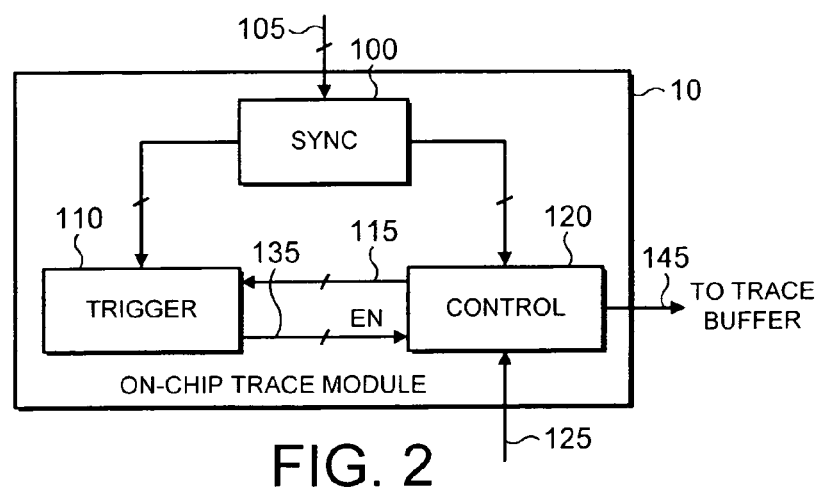
FIG. 2 is a block diagram illustrating in more detail the elements provided within the on-chip trace module of FIG. 1.

FIG. 2 is a block diagram illustrating in more detail the components provided within the on-chip trace module of FIG. 1. The on-chip trace module 10 is arranged to receive over path 105 data indicative of the processing being performed by the processor core 6. With reference to FIG. 1, this may be received from the bus connecting the core 6, cache 8, and on-chip trace module 10, along with additional control-type data received directly from the core (for example, an indication that the instruction address is being indexed, an indication that a certain instruction failed its condition codes for some reason, etc).

The sync logic 100 is arranged to convert the incoming signals into internal versions of the signals more appropriate for use within the on-chip trace module. These internal versions are then sent to the trigger 110 and the control logic 120, although it will be appreciated that the trigger 110 and the control logic 120 will not necessarily need to receive the same signals. Fundamentally, the trigger 110 needs to receive data relating to triggerable events, for example instruction addresses, data values, register accesses, etc. The control logic 120 needs to receive any data that would need to be traced dependent on the enable signals issued by the trigger 110. The control block 120 is further arranged to receive configuration information over path 125 from the general purpose computer 16, and is arranged to then issue signals over path 115 to the trigger 110 in order to set up the trigger logic configuration.

Whenever the trigger 110 detects events which should give rise to the generation of a trace stream, it sends an enable signal over path 135 to the control logic 120 to turn the trace on and off. The control logic reacts accordingly by outputting the necessary trace data to the trace buffer over path 145. It will be appreciated that a variety of enable signals may be provided over path 135, to identify the type of signals which should be traced, for example trace only instructions, trace instructions and data, etc.

In preferred embodiments, the control logic 120 of the on-chip trace module 10 is provided with additional logic to enable it to encode instruction set information with instruction addresses, and to then compress such encoded instruction addresses prior to them being output over path 145 to the trace buffer.

Figure 3:
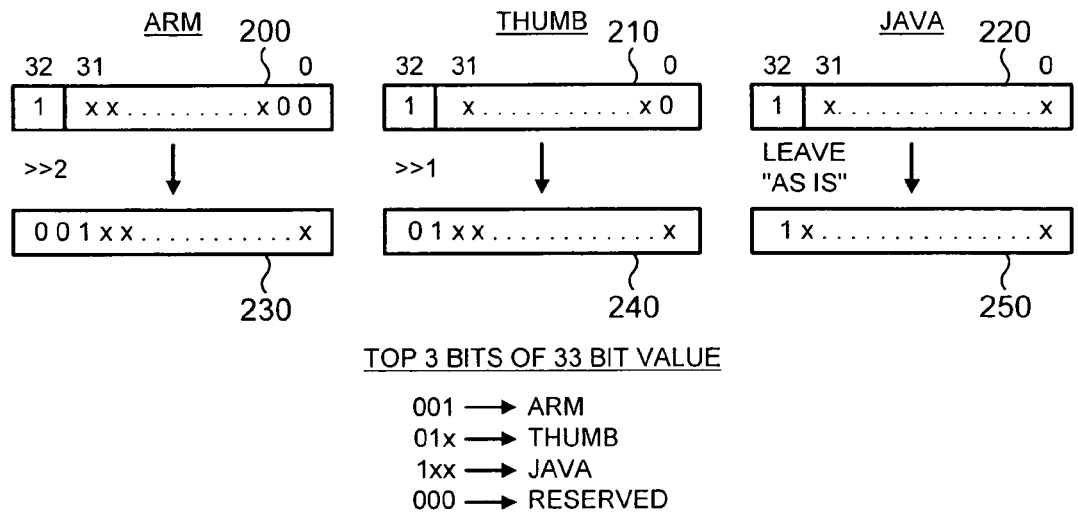
FIG. 3 is diagram schematically illustrating an encoding used in preferred embodiments of the present invention to incorporate instruction set information with an instruction address.

The encoding performed within the control logic 120 is illustrated schematically with reference to FIG. 3, where three different instruction sets that may be used by the processor core 6 are identified by the names "ARM", "Thumb" and "Java". In accordance with preferred embodiments of the present invention, instruction addresses are 32 bits in length. Java instructions may begin at any address location in memory, and accordingly all 32 bits need to be specified in a Java instruction address 220. However, Thumb instructions may only begin at even address locations in memory, for example location 0, location 2, location 4, location 6, etc. Accordingly, bit position 0 in a 32 bit Thumb instruction address 210 will always be zero.

Similarly, ARM instructions may only begin at every fourth address location in memory, for example location 0, location 4, location 8, location C, etc. Accordingly, the least two significant bits of a 32 bit ARM instruction address 200 will always be zeros.

In accordance with an embodiment of the present invention, a logic one value is pre-pended as a thirty third bit of each instruction address (i.e. is placed at bit position 32). Then, encoded instruction addresses are produced by applying an appropriate right shift to remove any irrelevant least significant bits of the instruction address. For Java instructions, since all 32 bits need to be specified, no right shifting is performed, and the encoded instruction address 250 is merely the 33 bit value given by prepending the logic one value to the original 32 bit Java instruction address 220. For Thumb instructions, a right shift of one is applied to remove the least significant bit, which produces a 33-bit encoded instruction address 240 where the most significant two bits are "01". Finally, for ARM instructions, a right shift of two bit positions is applied to remove the two least significant bits, whereby a 33-bit encoded instruction address 230 is produced with the most significant three bits being "001".

Hence, it can be seen that an indication of the instruction set to which the instruction address relates is given by the top three bits of the 33-bit encoded instruction address. In particular, "001" in the top three bits identifies the instruction as an ARM instruction, "01x" identifies the instruction as a Thumb instruction (x signifying any value), and "1xx" as the top three bits identifies the instruction as a Java instruction.

Figure 4:
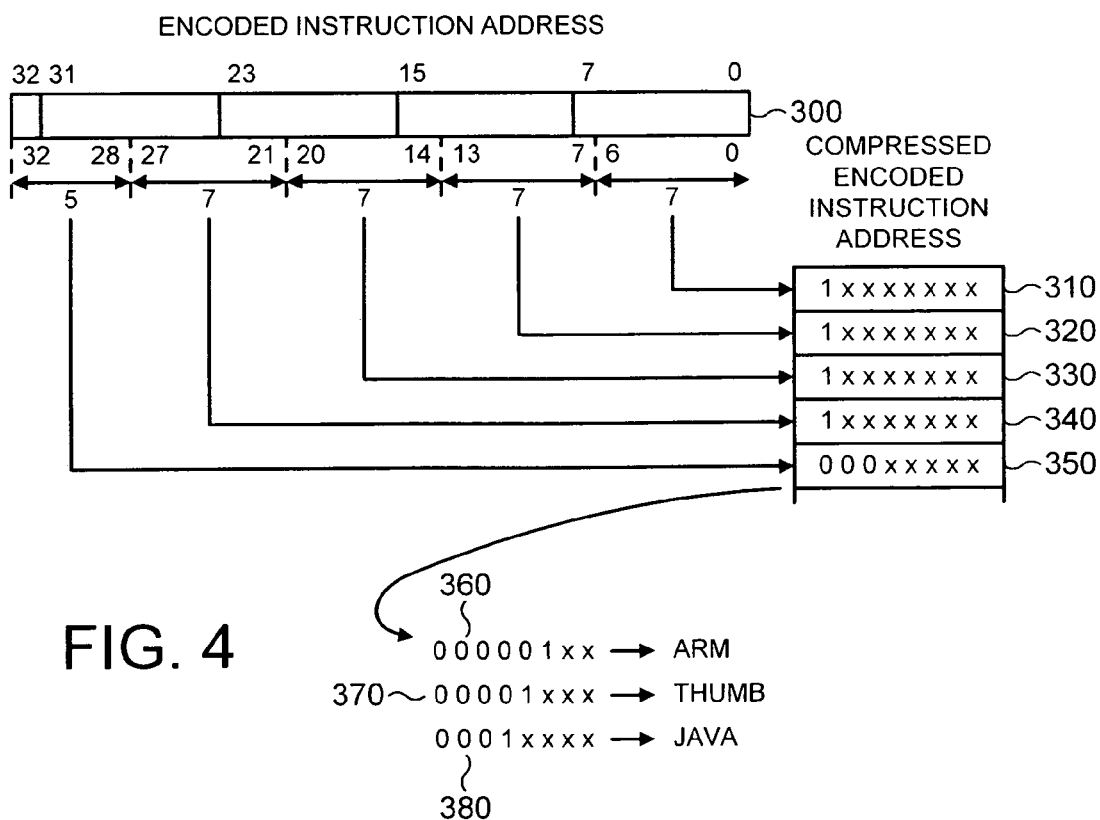
FIG. 4 is a diagram schematically illustrating how an address encoded in accordance with the approach illustrated in FIG. 3 is then compressed in accordance with preferred embodiments of the present invention.

In preferred embodiments, the 33-bit encoded instruction address is compressed prior to being output to the trace buffer over path 145, using a technique schematically illustrated in FIG. 4.

As illustrated in FIG. 4, the 33-bit encoded instruction address 300 (which may be any of the encoded instruction addresses 230, 240, 250 illustrated in FIG. 3) is split into 7-bit sections, the most significant 5 bits being extended to a 7-bit section by pre-pending two logic zero values to the 5 bits. Each 7-bit section to be output as the compressed encoded instruction address is extended to a byte (i.e. 8 bits) by prepending a flag to indicate whether the corresponding 7-bit section is the last 7-bit section being output as the compressed encoded instruction address. In preferred embodiments, the flag takes the form of a continuation bit, which is set to a logic one value to indicate that a further section is to be output, and is reset to a logic zero value to indicate that the corresponding section is the last section of the compressed encoded instruction address.

To decide whether any particular 7-bit section should be output as part of the compressed encoded instruction address, that 7-bit section is compared with a corresponding 7-bit section of a preceding encoded instruction address, typically the immediately preceding encoded instruction address, to determine whether it differs from that preceding 7-bit section. If it does differ, then it is output as part of the compressed encoded instruction address, with the corresponding continuation bit being set to a 1, whereas if it is identical to the preceding 7-bit section, it will only be output if there is more significant 7-bit section which does differ from the corresponding section of the preceding encoded instruction address. The only exception to this is the first 7-bit section relating to the least significant bits, which is always output.

It will be appreciated from FIG. 4 that when the encoded instruction address is completely different from the preceding one, such as will occur when there is a switch between instruction sets, then the compressed encoded instruction address actually takes up more bits than the original encoded instruction address. In particular, with reference to FIG. 4, if all five sections 310, 320, 330, 340, 350 need to be output, it can be seen that 40 bits are required for the compressed encoded instruction address. Nevertheless, switches between instruction sets typically occur relatively infrequently, and instruction addresses are often quite similar to their immediately preceding instruction address, and hence most encoded instruction addresses will be able to be significantly compressed as a result of using the compression technique illustrated in FIG. 4.

Looking now at section 350 of FIG. 4, it can be seen that the bit sequence in that section implicitly identifies the instruction set. In particular the sequence 360 will identify the ARM instruction set, the sequence 370 will identify the Thumb instruction set, and the sequence 380 will identify the Java instruction set.

Figure 5:
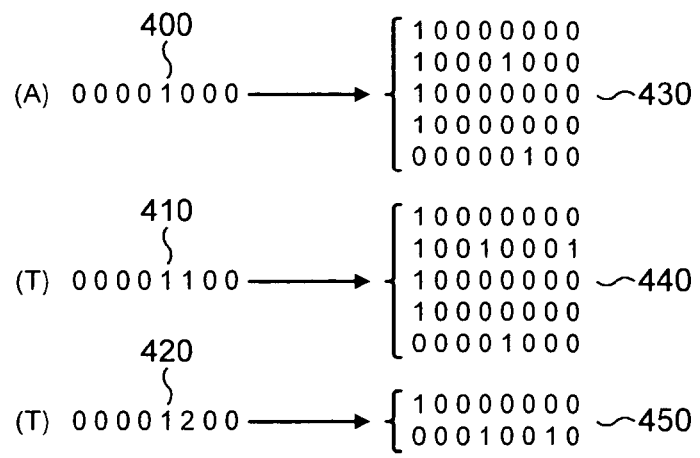
FIG. 5 is a diagram schematically illustrating the output of the compression logic for an example sequence of three instructions.

FIG. 5 gives an example sequence of three instructions 400, 410, 420 and illustrates the compressed encoded instruction addresses produced in accordance with preferred embodiments of the present invention. Instruction address 400 relates to an ARM instruction, and is written in hexadecimal notation. With reference to FIG. 3, it will be appreciated that the encoding results in the least significant two "0" bits being removed, and a pattern "001" being added as the most significant three bits. When the compression technique is applied to such an encoded instruction address, this results in the compressed encoded instruction address 430. The next instruction 410 is, in the example of FIG. 5, a Thumb instruction, and accordingly the least significant "0" bit is removed, and a pattern "01" added as the most significant two bits prior to compression. The compressed encoded instruction address 440 is then generated as a result of application of the compression technique. At this stage, information about the instruction set has efficiently been encoded with the instruction address, but the compression process has not produced any saving, since one ARM instruction was followed by one Thumb instruction.

However, if the next instruction is then a Thumb instruction 420, the compressed encoded instruction address 450 is produced. Hence, that 32-bit instruction address, along with information about its instruction set has now been represented by two bytes, i.e. 16 bits, this representing a highly efficient approach for generating both instruction address and instruction set information for storing in the trace buffer. It will be appreciated that significant compression is also likely for any further Thumb instruction addresses following instruction address 420.

Figure 6:
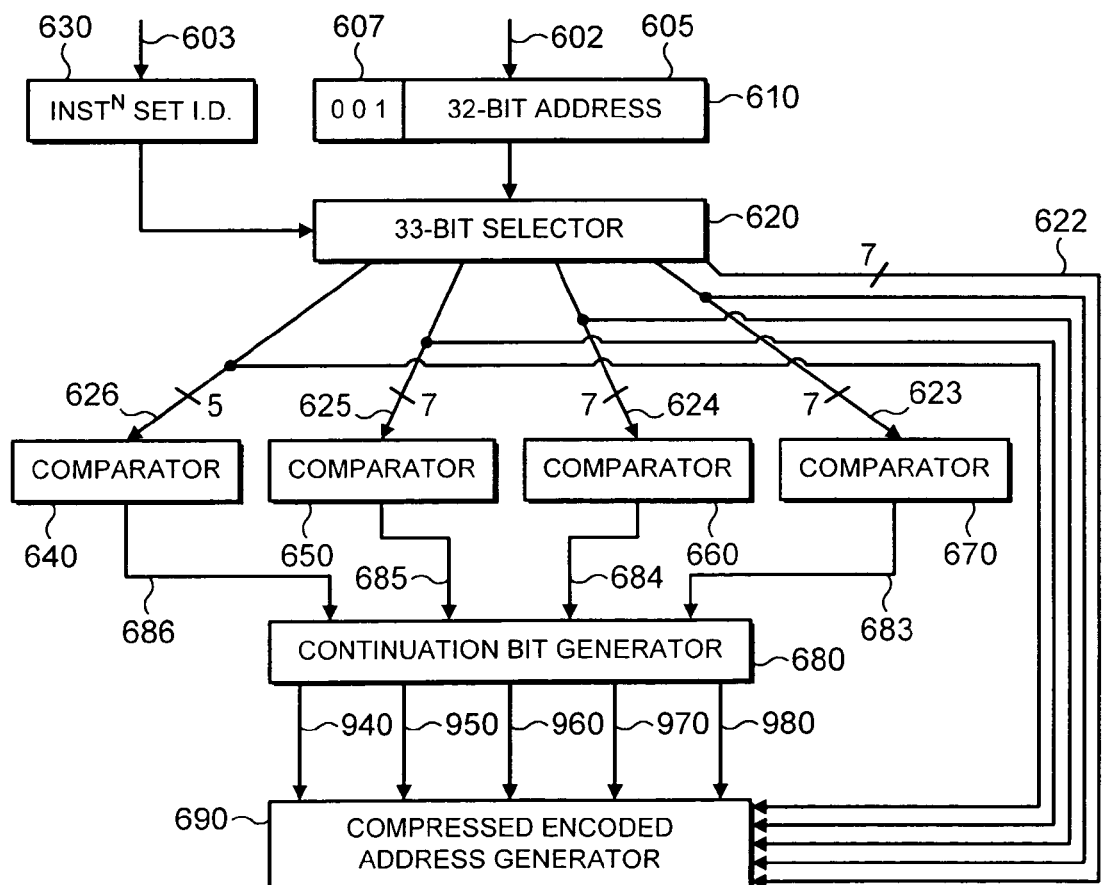
FIG. 6 is a block diagram schematically illustrating encoding and compression logic used in accordance with a preferred embodiment of the present invention.

FIG. 6 is a block diagram of the logic that may be provided within the control logic 120 of the on-chip trace module 10 in accordance with preferred embodiments of the present invention to provide the required encoding and compression. A register 610 is provided in which the most significant 3 bits 607 store a predetermined pattern of bits, in preferred embodiments "001". The least significant 32 bits of the register 610 receive a 32-bit instruction address 605 over path 602. Further, a latch 630 is provided for storing an instruction set identifier passed over path 603, identifying the instruction set to which the 32-bit instruction address stored in register 610 relates.

A 33-bit selector logic 620 is then arranged to receive the contents of the register 610 and the output of latch 630, and to select a predetermined sequence of 33-bits from the 35-bits in the register 610 dependent on the instruction set identifier. One embodiment of the 33-bit selector 620 is illustrated in FIG. 7.

Figure 7:
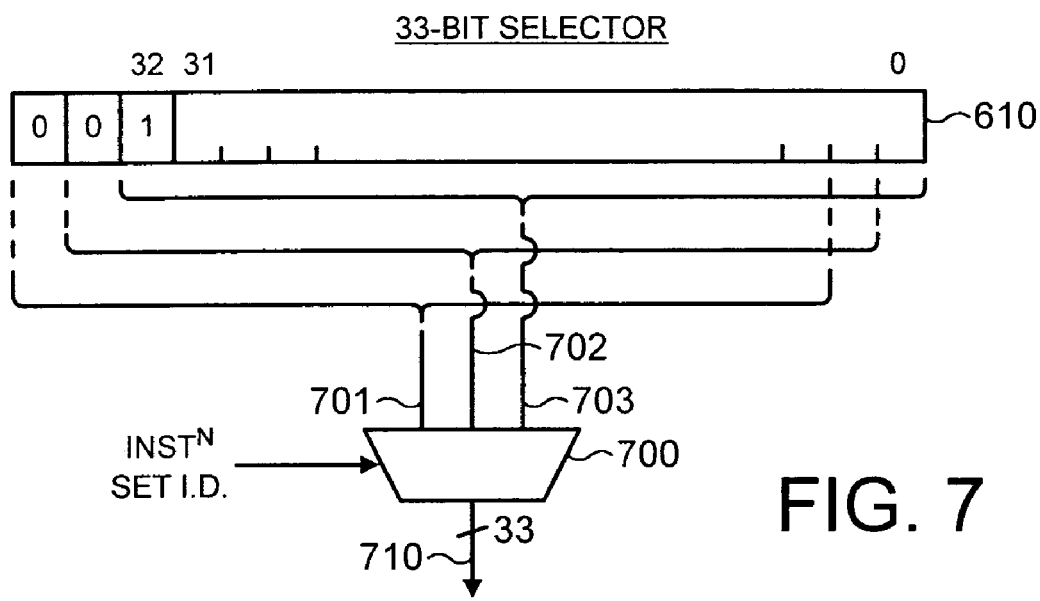
FIG. 7 is a diagram schematically illustrating the operation of the 33-bit selector of FIG. 6.

As can be seen from FIG. 7, the 33-bit selector 620 preferably comprises a multiplexer 700 which receives three separate inputs 701, 702, 703. Input 701 receives the most significant 33 bits from register 610, input 702 receives bits 1 to 33 and input 703 receives the least significant 33 bits. The multiplexer 700 will output on path 710 one of its 33-bit inputs dependent on the value of the instruction set identifier. More particularly, if the instruction set identifier identifies that the instruction is an ARM instruction, then the multiplexer 700 will output the input received over path 701, if the instruction set identifier identifies that the instruction is a Thumb instruction, then the multiplexer 700 will output the input received over path 702, and if the instruction set identifier identifies that the instruction is a Java instruction, then the multiplexer 700 will output over path 710 the input received over path 703.

Returning to FIG. 6, it can be seen that the 33-bit value output over path 710 is then partitioned into five distinct sections. In preferred embodiments, this is done by merely splitting the 33-bit wide bus 710 into four 7-bit wide buses 622, 623, 624 and 625 and one 5-bit wide bus 626. The least significant 7 bits of the output from multiplexer 700 are passed directly to the compressed encoded address generator as the least significant 7 bits are always output. The next least significant 7 bits are passed over path 623 to comparator 670, the next 7 least significant bits are passed over path 624 to comparator 660, the next 7 least significant bits are passed over path 625 to comparator 650, and the most significant five bits are passed over path 626 to comparator 640.

Figure 8:
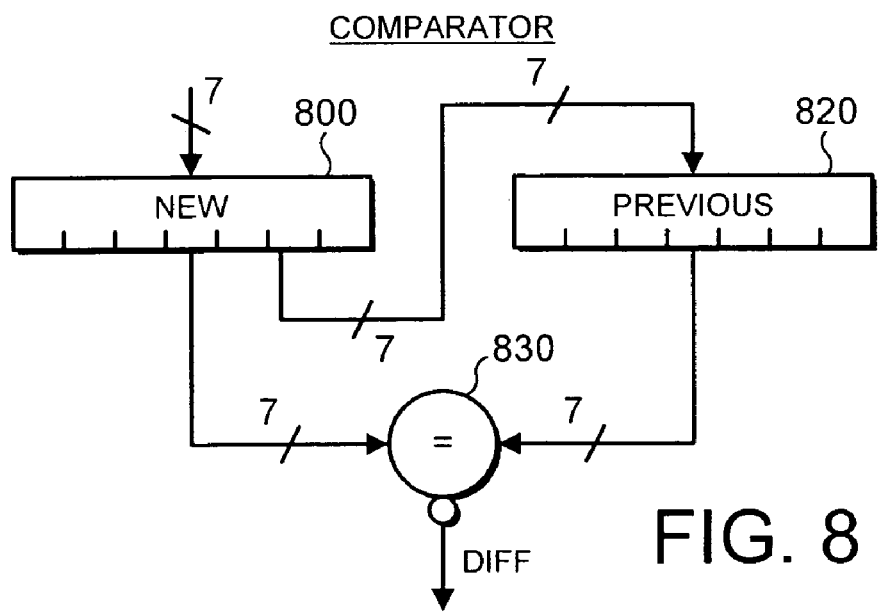
FIG. 8 is a diagram schematically illustrating the structure of one of the comparators illustrated in FIG. 6.

The construction of each comparator is schematically illustrated in FIG. 8. The comparator illustrated in FIG. 8 is arranged to process 7-bit numbers, and hence would be used for comparators 650, 660 and 670. Comparator 640 would be structurally similar to the comparator illustrated in FIG. 8, but would process a 5 bit number rather than a 7 bit number. When a new 7-bit section is received by the comparator, it is temporarily stored in register 800. It is then output to the comparator logic 830. At this time, the comparator logic 830 is also arranged to receive from register 820 the corresponding 7-bit section from the immediately preceding traced instruction address. The comparator 830 is arranged to compare the two 7-bit values to determine if they are identical, and if they are identical the comparator logic 830 will produce as a difference signal a logic zero value. Otherwise, the comparator logic 830 will generate as the difference signal a logic one value indicating that the current 7-bit section differs to the previous 7-bit section. When a next 7-bit section is received, it will be stored in register 800, whilst the previous contents of register 800 will be passed to register 820 for use in the next comparison process.

Returning to FIG. 6, it can be seen that each of the difference signals produced by the four comparators 640, 650, 660 and 670 are passed to a continuation bit generator 680 which is used to generate the continuation bits to be associated with each section to be output as part of the compressed encoded instruction address. An example of the logic that may be used to form the continuation bit generator 680 is illustrated in FIG. 9.

Figure 9:
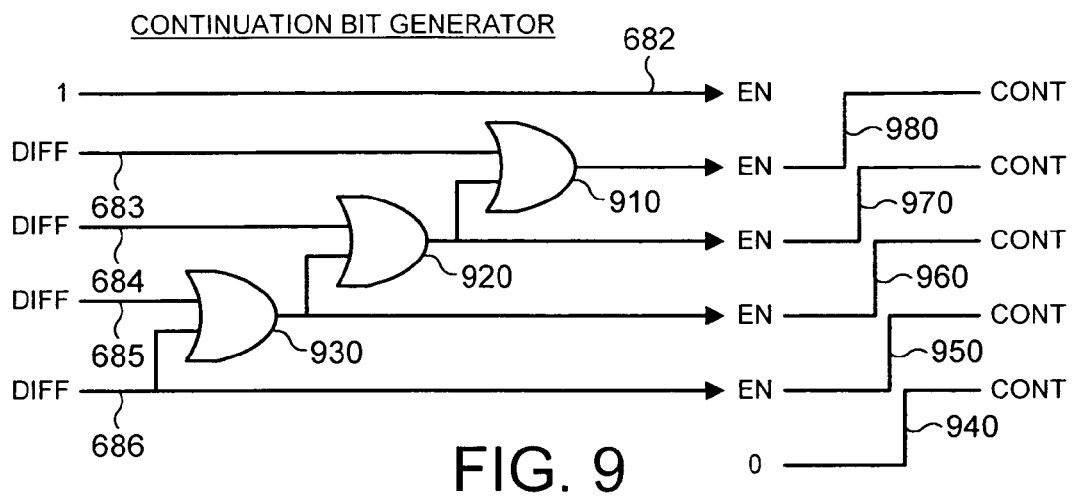
FIG. 9 is a diagram illustrating the logic used in preferred embodiments to implement the continuation bit generator illustrated in FIG. 6.

As can be seen from FIG. 9, the logic basically comprises a series of OR gates 910, 920 and 930 which are arranged to receive corresponding difference signals along with outputs from any other of the OR gates that have been processing difference signals relating to more significant sections of the 33-bit encoded instruction address. Hence, the difference signal issued over path 686 from comparator 640 is directly output over path 950 to form a continuation bit for the 7-bit section output from the 33-bit selector 620 over path 625. The continuation bit for the most significant section output by the 33-bit selector 620 over path 626 will always be a logic zero value, since that section will always be the last section of the compressed encoded instruction address if it is output at all. Accordingly, path 940 is hard wired to a logic zero value to provide the continuation bit for that section.

OR gate 930 is arranged to receive the difference signal over path 685 and 686, and so will generate a continuation bit having a logic one value over path 960 if either the difference signal on path 685 or on 686 is a logic one value. This continuation bit over path 960 will be used to qualify the 7-bit section output by the 33-bit selector 620 over path 624.

It can be seen that OR gates 920 and 910 work in an analogous manner, ensuring that a corresponding continuation bit is set to a logic one value if either its corresponding difference signal is set, or the difference signal relating to the comparison performed on any more significant section of the encoded instruction address is set. The continuation bit output over path 970 is used with the 7-bit section output over path 623, whilst the continuation bit output over path 980 is used with the 7-bit section output over path 622.

Returning to FIG. 6, all that is now required is to form the compressed encoded instruction address by combining the continuation bits with their associated sections output by the 33-bit selector, starting with the least significant 7-bit section, and to then determine how much of the compressed encoded instruction address to output to the trace buffer 12.

Figure 10A:
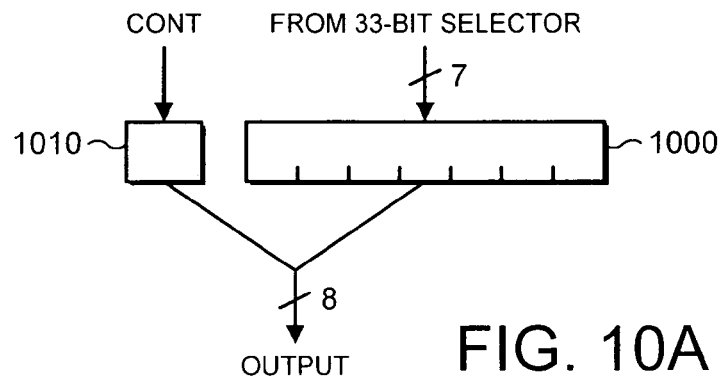
FIGS. 10A and 10B are diagrams schematically illustrating the process performed by the compressed encoded address generator of preferred embodiments.
Figure 10B:
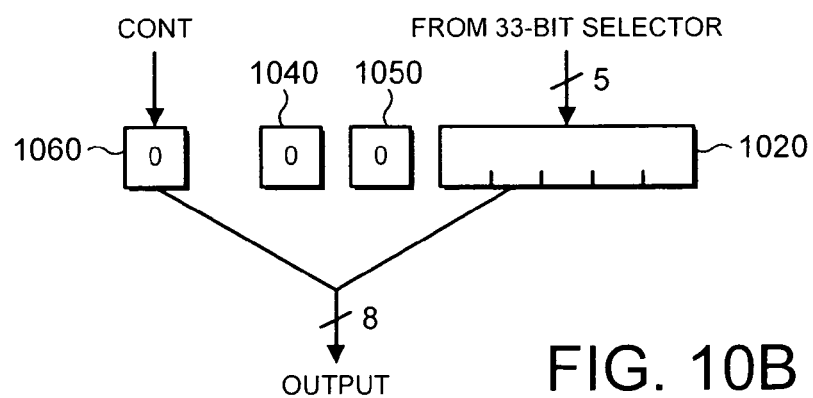

As soon as a logic zero continuation bit is encountered, then there is no need to output any further sections to the trace buffer. This function is performed by the compressed encoded address generator 690 illustrated in FIG. 6. The process is schematically illustrated in FIG. 10. As illustrated in FIG. 10, starting with the least significant 7-bit section, the 7-bit section 1000 is converted to an 8-bit section for outputting by adding the appropriate continuation bit 1010 as the most significant bit. This process is repeated for each 7-bit section in turn.

The 5-bit value 1020 corresponding to the most significant 5-bits is expanded to an 8-bit output by pre-pending two logic zero values 1040 and 1050 along with the continuation bit 1060. As described earlier, the continuation bit in this case will always be a logic zero value, since this section must be the final section of the compressed encoded instruction address.

The 40-bit value resulting from the above process is then output from the compressed encoded address generator, with the enable bits generated earlier by the continuation bit generator 680 being used to produce a length value, which is used to determine how many of the 8-bit sections within the 40-bit value to output to the trace buffer 12. For example, if the enable bits on path 682 and the output from the OR gate 910 are set, the least significant two 8-bit sections will be output to the trace buffer 12 as the compressed encoded instruction address.

From the above description of a preferred embodiment, it will be appreciated that an efficient technique has been described for incorporating instruction set information with instruction addresses, and for then compressing that encoded instruction address to provide an efficient representation for storage. In preferred embodiments, this technique is applied to a tracing mechanism, with the compressed data being stored in a trace buffer 12. Decompression logic can then be provided within the general purpose computer 16 for decompressing the compressed encoded instruction address. Given the detailed discussion already provided about the compression technique, it will be readily apparent to those skilled in the art how the decompression would work. In brief, the decompressor would read a sequence of 8-bit sections representing the compressed encoded instruction address, the sequence varying from one 8-bit section to five 8-bit sections, as indicated by the value of the continuation bit in the most significant bit position of each 8-bit section.

For a compressed encoded instruction address that does consist of five 8-bit sections, the encoded instruction address can be reconstituted by stripping off the continuation bit from each 8-bit section, and then joining the 7-bit sections together starting with the least significant 7-bit section. The least significant 33-bits then represent the encoded instruction address and the pattern in the most significant 3-bits of that 33-bit value will identify the instruction set. If the instruction is a Java instruction, then the 32-bit instruction address can be reproduced directly by merely outputting the 32 least significant bits of the encoded instruction address. If the instruction is a Thumb instruction, then the original instruction address is given by shifting the encoded instruction address left by one position and outputting the least significant 32-bits, the least significant bit then being a logic zero value. Similarly, if the instruction is an ARM instruction, then the original ARM instruction can be output by left shifting the encoded instruction address by two bit positions and outputting the least significant 32 bits, in this case the least significant two bits being logic zero values.

For a subsequent compressed encoded instruction address that consists of less than five sections, then the continuation bit can be removed from each section that is contained within the compressed encoded instruction address, and the least significant bits of the instruction address reconstituted by combining any such sections, starting with the least significant section. Depending on the number of sections in the compressed encoded instruction address, this will yield the first 7, 14, 21 or 28 bits of the instruction address. The remaining bits will be identical to the preceding decompressed instruction address, and accordingly can be determined from that previous decompressed instruction address.

A further description of the tracing techniques of at least preferred embodiments of the invention are given in the following architectural description, which should be read in conjunction with the Embedded Trace Macrocell (REV1) description publicly available from ARM Limited, Cambridge, England:

1.1

This document uses the following terms and abbreviations.

| Term | Meaning |
| --- | --- |
| Current protocol | ETM protocol used for ETM7 and ETM9 |
| New protocol | Protocol for ETM10 |
| ETM packet | Several bytes of related data placed into the ETM FIFO in a single cycle. Up to 3 packets can be placed into the ETM10 FIFO in one cycle |
| Packet header | The first byte of an ETM packet that specifies the packet type and how to interpret the following bytes in the packet |
| CONTEXT ID | A 32bit value accessed through CP15 register 13 that is used to identify and differentiate between different code streams. This value was previously referred to as the Process ID in ETM7 and ETM9 documentation. The name has changed to avoid confusion with the 7bit FCSE PID register, which is also located in CP15 register 13 and has also been referred to as Process ID. |
| Trace Capture Device | Any device capable of capturing the trace produced by the ETM: a TPA, a logic analyser, or an on-chip trace buffer. |
| LSM | Load or Store Multiple Instruction: LDM, STM, LDC or STC instruction |
| Exceptions | Instructions that interrupted by an IRQ, FIQ, PABORT, or reset assertion |

Scope

This document is intended to specify the functionality of the ETM10. ETM10 is a real time trace module capable of instruction and data tracing. Functionality is similar to that of previous ETM implementations for the ARM7 and the ARM9. It is assumed that the reader is familiar with the original ETM specification which is outlined in the Embedded Trace Macrocell Specification (ARM IHI 0014D). This specification is not intended to restate the common architectural features between ETM10 and previous ETM versions, but rather to discuss the portions of the ETM specification that change for ETM10. Most of these changes involve the creation of a new ETM protocol that is capable of properly tracing ARM1020E. This protocol is intended to be extensible for tracing future ARM cores as well.

Introduction

The Embedded Trace Macrocell is an integral part of ARM's Real Time Debug solution which includes the ETM, a trace port analyser, and a software debugger (such as ADW).

An Embedded Trace Macrocell consists of two parts, a trace block and a trigger block. The trace block is responsible for creating the compressed trace and outputting it across the narrow trace port. The trigger block contains programmable resources that allow the user to specify a trigger condition. The trigger block resources are also used as a filter to control which instructions and which data transfers are traced. All ETM configuration registers (including the trigger block resources) are programmed through the JTAG interface. The user accesses these registers using a software debugger. Once the trace has been captured, the debugger is also responsible for decompressing the trace and providing with user with a full disassembly of the code that was executed. Since the debugger software would not be capable of processing the ETM trace port output in real time, the trace is initially captured into an external Trace Port Analyser (TPA). The TPA may be a fully functional logic analyser, or an ETM specific device such as the Agilent nTrace box. The debugger extracts the trace information from the TPA once the trigger condition has occurred and the debug run has completed. At this high level of description, ETM10 is functionally identical to ETM7 and ETM9.

Changes Required for Etm10

From a user's view, ETM10 will provide equivalent instruction and data tracing capability to that provided by ETM7 and ETM9 with just a few minor differences. This section describes the changes that are being made to the ETM architecture for ETM10 and why they are being made. Many changes affect only the decompression software and are invisible to the rest of the trace toolkit software as well as the end user. However, some changes do affect the programmer's model or result in minor differences in tracing behaviour from ETM7 and ETM9. Such changes are noted in this section. Any changes for ETM10 that require in-depth explanations of the new protocol are covered more thoroughly in the protocol description given in section 5.

1.2 Branch Phantom Tracing

ARM10 implements "branch folding" which means a branch can be predicted, pulled out of the normal instruction stream, and effectively executed in parallel with the next instruction in the program. These folded branches are referred to as branch phantoms. The PIPESTAT encodings in the old protocol only account for one instruction executed per cycle. To allow branch phantoms to be traced, new encodings will be added to the PIPESTAT field that represent a folded branch in parallel with an instruction. The new PIPESTAT values are given in the ETM10 protocol specification in section 5.

Folded branches require changes to the trigger block as well. When a branch is folded, effectively two instructions are executed in parallel. Since the PC value for these two instructions is not guaranteed to have any identifiable relationship, two address comparisons must be made each cycle. This implies that each address register will require two comparators. Both comparator outputs will be taken into consideration when determining whether or not tracing is enabled. (If either of these two instructions should be traced, then tracing will be enabled that cycle.) Special care has been taken to insure that, at most, one extra instruction is traced due to branch folding. In general, the user does not need to be aware when a branch has been folded and executed in parallel with the next instruction to properly program TraceEnable or ViewData.

For events, parallel execution of instructions makes it possible to have slightly different behaviour from ETM10 versus ETM7/9. It is not felt that there is much loss of functionality here due to the way events are typically used. Counters can only count down once per cycle, but counting has only ever provided an accurate count of accesses when single address comparators are used. Furthermore, there is no loss of functionality to the Trigger, TraceEnable, ViewData or ExtOut events: here the event will be active if either instruction or data transfer would have individually caused it to be active, which is the desired behaviour. If the sequencer receives multiple transition requests in the same cycle, no transitions will take place and the sequencer remains in the original state. This behaviour is identical to that of ETM7 and ETM9. However, ETM10 may have more occurrences of multiple transition requests in a cycle since ARM10 supports more parallel execution. The user will need to be aware of this behaviour when programming the sequencer, but there is a workaround for simple events. If the desired behaviour is to transition from state 1->2 based on event A and from state 2->3 based on event B, program 1->2 to occur on event (A & !B), 2->3 on event B, and 1->3 on event (A & B). Programming the sequencer in this way insures the proper handling of simultaneous occurrence of event A and event B.

1.3 Load Miss and Exception Tracing

ARM10 has a non-blocking data cache that allows other instructions, including other memory instructions, to execute underneath a single outstanding miss; thereby allowing the data cache to return data to the core out-of-order. This feature is an issue for tracking load data since the current protocol expects load data to be placed in the FIFO in-order. Data packets are now prefixed by a header byte in part to accommodate out-of-order load miss data. Header bytes are described in detail in section 5.

Supporting a non-blocking cache also requires changes to data comparators. Like ETM7 and ETM9, ETM10 has data comparators which are used in conjunction with a pair of address comparators. When used, the comparator will only trigger a match when the data matches as well. Since other memory accesses can occur underneath a miss, a bit is added to each comparator to remember whether or not the address for a load request that resulted in a miss matched. When the load miss data is returned, the data value comparison is done, and the saved address match bit is used to qualify the results of the comparison. This match bit is then cleared. In some cases, the user may not wish to wait for miss data to be returned to enable the comparator. Instead, they may want load misses to always be traced based on the data address only. To support both usage models, a bit has been added to the address access type register to allow the user to specify which mode is enabled for each comparator. The user should set bit 8, the Exact Match bit, of the address access type register if waiting for load miss data on a comparison is desired. (Refer to reference 1 for more information on the access type registers.) Waiting for the data compare to occur is useful when data values are used to create triggers and other events. Tracing load misses based on the address alone is useful when the comparator is used for trace filtering and some extraneous tracing is not considered to be a problem. The user should be aware that using data values to create an event, such as a sequencer transition, could result in out-of-order events occurring since the load data may be returned out-of-order. If the user has concerns that ARM10's non-blocking cache may affect programmed events, this feature may be disabled in the core through writes to the cp15 configuration register (r1). Refer to the ARM1020E TRM (reference 3) for more information.

Bit 7 of the access type register is also used to specify comparator behaviour when an abort, interrupt, or soft reset occurs. These conditions are generically referred to as exceptions. If a data access is aborted and bit 7 is asserted, the comparator will NOT result in a match output, regardless of whether or not a data match is requested. If the comparator is tied to an instruction address, then the exact match bit is used to prevent matches on instructions, which are marked as exceptions. This behaviour is often desired when a comparator is meant to fire just once since instructions and data requests that result in exceptions are usually reattempted once the aborting or interrupting condition has been resolved. In the data access case, when bit 7 is not asserted, an aborted access will result in a match based purely on the address since the data value is assumed to be invalid.

The same Exact Match bit is used for determining proper handling of load misses and data aborts since the desired behaviour would typically be the same for both cases. The default value for the Exact Match bit is zero.

1.4 ARM10 Data Tracing

ARM1020E has a 64bit data bus capable of returning 64bits of data in a single cycle. To support this 64bit data bus, ETM10 must be capable of tracing two adjacent data values in a single cycle. To support tracing just one value or the other, two ViewData outputs are now generated. However, there is still just one output for events and one output for TraceEnable. Having one event output can affect the counter and sequencer logic since two adjacent 32bit requests that are accessed in the same cycle will only result in one decrement of the counter or only one state change by the sequencer. This should be taken into account by the user when programming event logic, but it is not expected to be a significant problem.

1.5 LSM Tracing

The ARM1020E has an independent load/store unit, which allows other instructions to execute underneath a load or store multiple instruction, hereafter referred to as an LSM, while the load/store unit iterates through the data accesses. (i.e. executing an LSM does not stall the core). To support this, some changes are required to the address comparator output and to the assertion of TraceEnable:

Whenever tracing it active while iterating on an LSM instruction, it will remain active until the LSM completes, regardless of whether or not TraceEnable remains asserted. (The only exception to this rule would be the overflow case.) This rule has the side effect of causing other instructions executed underneath the LSM to be traced regardless of whether or not they otherwise would have been. However, it will not result in any extra data packets since instructions running underneath the LSM by definition cannot be data instructions.

Whenever a comparator is activated on the instruction address of an LSM, the ViewData output of that comparator will remain asserted until the entire instruction completes. This is done since the intention of the user is to trace all data packets associated with this instruction. In a similar fashion, ViewData and Event range outputs will remain asserted until the completion of the LSM instruction. Event single address comparator outputs do not remain asserted since by definition these outputs should assert for just a single cycle.

Once a data transfer associated with an LSM has been traced, subsequent transfers associated with that instruction that would not normally be traced will have a placeholder packet output (Value Not Traced-see section 5) These placeholder packets are required to determine which words were traced.

The ETM protocol allows for instruction tracing to be enabled based on load/store data addresses (and data values). Since on ARM10, the LSM instruction may no longer be in the core's execute stage when the tracing enabling event occurs, this instruction address will need to be kept around and broadcast in a special way to support this feature. This is accomplished using the LSM in Progress TFO packet. Trace Packet Offsets are described in section 5.2.4.

1.6 Auxiliary Data Tracing

The addition of data headers to the protocol also allows for the tracing of auxiliary data types (i.e. the tracing of data values other than those for load, store, and CPRT instructions). This auxiliary data type tracing is meant to allow for expansion of ETM tracing, which may include the tracing of external ASIC data in future versions of the ETM. More information is given on auxiliary data tracing in the data headers discussion in section 5.

1.7 CONTEXT ID Tracing

CONTEXT ID values need to be broadcast whenever they are updated and whenever a TFO packet is required for synchronisation. For ETM10, CONTEXT ID values are output when they are updated by simply enabling data tracing for the CPRT instruction that resulted in a CONTEXT ID change. A unique data header for this data packet allows the decompressor to recognise that the data is a new CONTEXT ID value (data headers are discussed in section 5). The ETM also broadcasts the current Context ID value whenever trace is enabled, and during trace synchronisation cycles which are described in section 5.2.4.The CONTEXT ID update instruction is: MCR c15, 0, rd, c13, c0, 1.

Rather than requiring another 32bit port on the ARM10<->ETM10 interface, ETM10 recognizes Context ID updates and maintains the current Context ID value in an internal shadow register. To properly maintain coherency, this register will always be updated, even when the ETM is in POWERDOWN mode. (ETM register 0x4, bit 0 is asserted).

Using CONTEXT ID values for trace filtering is being added as an additional feature for ETM10. This will be implemented via a new set of programmable registers in the ETM in which an expected CONTEXT ID value can be specified:

| Register encoding | Description |
| --- | --- |
| 110 1100 | CONTEXT ID value 1 |
| 110 1101 | CONTEXT ID value 2 |
| 110 1110 | CONTEXT ID value 3 |
| 110 1111 | CONTEXT ID mask value |

The same mask is used for each CONTEXT ID comparator, and works in the same way as data comparator masks.

Bits 9:8 of the address comparator access type registers will indicate whether CONTEXT ID comparators are used. A value of 00 causes the CONTEXT ID comparators to be ignored. A value of 01, 10 or 11 causes the address comparator to match only if the current CONTEXT ID matches that in CONTEXT ID comparator 1, 2 or 3 respectively, after taking account of the CONTEXT ID mask.

New event resources will be allocated to allow the CONTEXT ID comparators to be accessed directly from within the event block (see section 3.3.4 of ARM IHI 0014D). These new resources will be mapped to 0x58-0x5A:

| Bit encoding | Range | Description |
| --- | --- | --- |
| 101 | 0x8 to 0xA | CONTEXT ID comparator matches |

A new field will be added to the ETM configuration code register to indicate the number of CONTEXT ID comparators present (see section 4.2.2 of ARM IHI 0014D):

| Bit numbers | Valid Range | Description |
| --- | --- | --- |
| 25:24 | 0 to 3 | Number of CONTEXT ID comparators |

1.8 Trace Output Frequency

The ARM1020E Macrocell will be capable running at core frequencies beyond 300 MHz. Previous ETM implementations have not pushed frequencies beyond 200 MHz. The maximum output frequency attainable for an ETM trace output is dependent upon the maximum sample frequency of the trace analyser and the maximum output frequency attainable at the pads. Agilent and Tektronix analysers can capture at a maximum frequency of 333 MHz and 400 MHz, respectively. However, it is highly unlikely that any CMOS pads available from ARM partners will be capable of providing clean, traceable signals at this frequency. Therefore, the pads are expected to be the speed-limiting factor. Some speed improvements can be obtained by using larger pads and/or using board level buffering. These techniques may allow us to trace reliably at 200 MHz. For tracing at higher speeds, there are two options. We can double the pin count and halve the frequency (a demultiplexed trace port), or we can utilise an on-chip trace buffer. Both techniques have positive and negative points.

Doubling the pin count is not an attractive option to some partners due to package limitations and the high cost of additional pins. This technique will also require changes to the TPA, and, most likely, the addition of a second mictor connector which takes up more board area and adds more cost. Furthermore, this technique still has a speed limitation of 400 MHz. An ARM10 processor fabricated in a hot process will most likely exceed these speeds.

The on-chip buffer has the advantages of tracing reliably at the core clock speed and of not requiring any extra pins. In fact, if all trace capturing will be done utilising the on-chip buffer, then the externally visible ETM port can be eliminated since the on-chip buffer would be downloaded via Multi-ICE through the JTAG port. The disadvantage of this solution is that the size of the on-chip buffer is typically quite small, on the order of 8-16 KB. Therefore, tracing depth is limited. Larger on-chip trace buffers are possible, but directly impact the size of the ASIC, and even a small trace buffer may use more silicon space than can be afforded in some designs.

Due to the varying advantages and disadvantages of each method, both of the options listed above are planned to be supported. The ARM10200 rev 1 test chip will be built with a demultiplexed trace port for high-speed tracing. An on-chip trace buffer will not be part of the ARM10200 rev 1 test chip.

A specification for an on-chip trace buffer for ETM9 has been written, and an implementation is in progress. It would be possible to create an ETM10 compatible on-chip trace buffer from this design with just a minor change to support the new 4 bit PIPESTAT encodings that are described in detail in section 5.2. Refer to reference 4 for more information on what Trace Capture Device changes are required to support ETM10. Depending on timescales, an ETM10 compatible on-chip trace buffer may offer additional features, such as dynamic trace compression, and it may in fact be integrated directly into ETM10 design as a FIFO replacement.

1.9 Synchronisation Register

In previous ETM implementations, synchronisation occurred via a five-byte instruction address every 1024 cycles, and a five-byte data address every 1024 cycles. For ETM10, these synchronisation points will be configurable via a new 12bit programmable register. Configurable synchronisation makes it easier to utilise a full range of trace buffer sizes. Small trace buffers, such as the on-chip trace buffer, can synchronise frequently to avoid throwing away large portions of the trace, while larger trace buffers can synchronise infrequently to avoid wasting trace throughput on unneeded synchronisation. The default counter value will be 1024 cycles. To prevent data address and instruction address synchronisation from occurring concurrently, data address synchronisation will occur when the counter reaches its midpoint value and instruction address synchronisation will occur when the counter reaches zero. The address for the new synchronisation register is 0x78.

1.10 Memory Map Decoder

The external memory map resource inputs that were present in previous ETM implementations are not being supported for ETM10. The extra complexities present in the ARM10 architecture make support for an external decoder more difficult to implement. External events can still control tracing by utilising the EXTIN inputs, which are now cycle accurate (discussed in section 4.15).

1.11 Rangeout

Previous ETM implementations have been able to use data value compare registers inside the Embedded ICE logic as extra trigger resources. This functionality was accomplished by using the RANGEOUT outputs coming from the Embedded-ICE. The ARM10 debug unit does not have these RANGEOUT outputs since it does not have any data value compare functionality. Therefore, this resource reuse is not possible for ETM10. This has a minor impact on the programmer's model since these resources can no longer be programmed.

1.12 Branches to Interrupt Vectors

The current protocol specifies that direct branches to entries in the interrupt vector table must be traced as indirect branches. This is no longer always possible as phantom branches cannot be converted into indirect branches within the proposed protocol. Therefore for consistency and simplicity direct branches to interrupt vectors will no longer be traced as indirect branches, regardless of whether or not the direct branch was a branch phantom. It is possible to detect branches to the PABORT, FIQ, IRQ, DABORT, and RESET vectors due to a special encoding in address byte 5 that is described in 5.3.1

1.13 Protocol Version

The 4-bit ETM protocol version field present in the configuration code register (register 0x01) on ETM7 and ETM9 has been determined to be insufficient to support future protocol versions for the ETM. Therefore, a new ETM ID register has been defined that contains fields specifying the ARM core for which it is intended as well as minor and major protocol revision numbers. This register is mapped to register address 0x79 and is considered valid whenever bit 31 in the configuration register is set. This allows ETM7 and ETM9 to still use protocol variants 0-7 without requiring the ID register. The ETM ID register will contain a 32bit value broken up into the following fields:

| Bit numbers | Description | Examples |
| --- | --- | --- |
| [3:0] | Minor protocol number | ETM 7/9 rev 0 = 0 |
| | | ETM 9 rev 0a = 1 |
| | | ETM 7/9 rev 1 = 2 |
| [7:4] | Reserved | N/A |
| [11:8] | Major protocol number | ETM 7/9 = 0 |
| | | ETM 10 = 1 |
| [15:12] | ARM Core | ARM 7 = 0 |
| | | ARM 9 = 1 |
| | | ARM 10 = 2 |
| [16] | Indicates that 32bit data value comparisons require 2 register updates | ARM 10 = 1 |
| [23:17] | Reserved | ARM 10 = 0x00 |
| [31:24] | ASCII character 'A' | ARM 10 = 0x41 |

ETM10 rev0 will have the ID value 0x41012100.

1.14 Trace Start/Stop Resource

A new event resource will be included to give the current state of the TraceEnable start/stop logic. This shall be given resource number 101 1111 (see section 3.3.4 of ARM IHI 0014D), and shall be asserted whenever the Trace Start/Stop block is active. ETM versions that support the start/stop resource will also assert bit 23 in the ETM control register.

1.15 TPA Changes

All TPAs will need a minor change to support the new trigger and trace disable status values for ARM10. Namely, they must ensure that PIPESTAT[3]/TRACESYNC is LOW in order to detect TR and TD PIPESTATs. For logic analysers this is simply a minor software change. The Agilent nTrace will require minor hardware changes as well. To support high speed tracing through a demultiplexed, half speed ETM port, the TPA will need to be capable of capturing two core cycles worth of trace data in each cycle. This data will be broadcast across two Mictor connectors. Therefore, support for multiple connectors is required as well. For more information on these changes, please refer to reference 4.

1.16 Precise Events

In ETM7 and ETM9, events generated via the Event block were imprecise, which means the user was not guaranteed to trace the data access or the instruction that generated the Event. For ETM10 this is no longer the case. Assertion of ViewData and TraceEnable is always precise regardless of how it is generated.

1.17 FIFOFULL Level Register

For ETM7 and ETM9 register 0x0B was used to set the level at which the FIFO must reach before FIFOFULL would be asserted. For ETM10, FIFOFULL this register is not used and instead FIFOFULL, when enabled, is asserted whenever new packets are to be placed in the FIFOFULL. ETM10 is more deeply pipelined than ETM7/9, and FIFOFULL can only be asserted early enough to be useful if it is used in this way. In ETM10, the FIFOFULL register is reused as a read-only register that specifies the FIFO size. FIFO size is something that could not be determined by software in ETM7/9.

1.18 TRIGGER Output

If the processor is in monitor debug mode, DBGRQ will be ignored. Therefore, it is useful to have some other mechanism to allow the core to recognize that a trigger has occurred. For this purpose, a single bit TRIGGER output has been added to the ETM interface for ETM10. The TRIGGER output is asserted whenever the four-bit TRIGGER status is driven on the PIPESTAT bus. This signal can then be used by an interrupt controller to notify the core of the trigger via the assertion of an interrupt. The TRIGGER output can be left unattached if it is not needed.

1.19 Counter Event

For ETM7/9, the counter event registers had an extra bit 17 which could be used to count continuously. This bit has been removed since its behaviour is redundant and hard to verify. If the user wants a continuous counter, simply program the event equal to external resource 15, which is hardwire to be always active.

ETM10 Trace Port

1.20 ETM10 Port Signals

The ETM10 trace port consists of two signals, PIPESTAT and TRACEPKT, which are both valid on the rising edge of TRACECLK (which has the same frequency as GCLK.) PIPESTAT has been expanded for ETM10 from a 3 bit to a 4-bit signal to add encoding space for branch phantoms. TRACEPKT has not changed from the previous ETM versions; it can be 4, 8, or 16 bits depending on the configuration. The TRACESYNC pin has been removed from the protocol since synchronization is now achieved via another mechanism. The overall result is a trace port with the same pin count as previous ETM implementations.

1.21 PIPESTAT Encodings

| Encoding | Mnemonic | Description |
| --- | --- | --- |
| 0000 | IE | Instruction executed |
| 0001 | DE | Instruction executed, packet(s) have been placed on the FIFO |
| 0010 | IN | Instruction not executed |
| 0011 | DN | Instruction not executed, packet(s) have been placed on the FIFO |
| 0100 | WT | Wait: No instruction this cycle, valid data is on the trace port |
| 0101 | DW | Wait + data: No instruction this cycle, packet(s) have been placed on the FIFO |
| 0110 | TR | Trigger: Trigger condition has occurred, real PIPESTAT value is on TRACEPKT[3:0] |
| 0111 | TD | Trace disabled: no data on trace port |
| 1000 | PT_IE | Branch phantom taken + IE |
| 1001 | PT_DE | Branch phantom taken + DE |
| 1010 | PT_IN | Branch phantom taken + IN |
| 1011 | PT_DN | Branch phantom taken + DN |
| 1100 | PN_IE | Branch phantom not taken + IE |
| 1101 | PN_DE | Branch phantom not taken + DE |
| 1110 | PN_IN | Branch phantom not taken + IN |
| 1111 | PN_DN | Branch phantom not taken + DN |

1.21.1 Branch Phantom PIPESTATs

The eight new branch phantom encodings are added to account for branch phantoms that are executed in parallel with the following instruction. These encodings should always be interpreted as the branch instruction being first in the execution stream. Only direct branches are predicted, so branch phantoms never place data packets in the FIFO. Folded branches that are mispredicted will result in a normal IE/IN PIPESTAT since any instruction that would have been executed in parallel was from the incorrect instruction stream and was therefore canceled.

1.21.2 Data PIPESTATs

All mnemonics starting with 'D' mean that a data packet of some sort has been placed in the FIFO that cycle and will eventually be output on the TRACEPKT pins. Note that the word 'packet' for the new protocol refers to a multiple byte quantity that is placed in the FIFO rather than a single byte in the FIFO. The data packet may be a branch address, a load/store transfer, a CPRT transfer, or an auxiliary data packet. ETM10 is will place up to a maximum of three data packets in the FIFO in one cycle (two LDST/CPRT transfers and one branch address packet.) Note that three packets in one cycle is a limitation of the hardware, not the protocol. The need for separate data and branch PIPESTATs has been removed by the addition of packet header bytes to the protocol. The addition of DW and DN status values allows a data packet to be attached to any arbitrary cycle. This addition means that coprocessor maps for determining the length of LDCs/STCs are no longer necessary, and tracing of variable length LDC/STC instructions is now supported. Packet header bytes will be described in more detail in section 5.3.

1.21.3 Instruction PIPESTATs

Non-wait PIPESTAT values, i.e. those that indicate an instruction was executed, are always given on the first cycle the instruction is executing. This distinction is important for LSM instructions that execute and return data for several cycles. Note that this behavior is different from previous protocol versions, which would give the executed PIPESTAT value on the LAST cycle the LSM was executed. "Not executed" PIPESTATs (IN/DN) can occur due to two reasons. Either the instruction has failed its condition codes, or it was not executed due to an exception. As mentioned earlier, possible exceptions include interrupts, prefetch aborts, and reset assertion. Load/store instructions that result in data aborts are not given a IN/DN status since they are considered to have executed. The decompressor needs to know when an exception is preventing an instruction from executing. This information is used to prevent late data packets from a previous LSM instruction from being attached to the exception instruction. (The only data packets allowed for an instruction with a 'not executed' PIPESTAT is a branch address.)

1.21.4 TD Status and TFOs

A status of TD means that trace FIFO data is not present on the TRACEPKT this cycle. There are two reasons why this could occur.

There is no data to be traced in the FIFO (if the FIFO is not empty, the status would be WT) In particular, this will occur shortly after trace is disabled until it is next enabled.

A TFO is being broadcast for ETM synchronization.

When a TD status is given on PIPESTAT, the decompression software will need to look at the TRACEPKT value to determine whether or not a TFO has been broadcast. TRACEPKT[0] is used to differentiate between cycle-accurate, and non-cycle accurate trace as is done in previous ETM implementations. As before, Trace Capture Devices may discard TD cycles where TRACEPKT[0]=0. If TRACEPKT[0] is asserted, TRACEPKT[3:1] is used to specify whether or not a TFO is broadcast. When a TFO is broadcast, TRACEPKT[7:4] specify the lower four bits of the TFO value. TRACEPKT[3:1] specify the remainder of the TFO value as given in the table below. TFOs are encoded in this way to maximize the range of valid TFO values.

| TRACEPKT[3:0] | Description |
| --- | --- |
| XXXXXXX0 | Trace disabled; non-cycle accurate |
| XXXX0111 | Trace disabled; cycle accurate |
| XXXX1001 | TFO value 0–15 (TRACEPKT[7:4] + 0) |
| XXXX1011 | TFO value 16–31 (TRACEPKT[7:4] + 16) |
| XXXX1101 | TFO value 32–47 (TRACEPKT[7:4] + 32) |
| XXXX1111 | TFO value 48–63 (TRACEPKT[7:4] + 48) |
| XXXX0001 | TFO value 64–79 (TRACEPKT[7:4] + 64) |
| XXXX0011 | TFO value 80–95 (TRACEPKT[7:4] + 80) |
| XXXX0101 | Reserved |

A TFO, or Trace FIFO Offset, is used when decompressing the trace information to synchronize between the pipeline status (PIPESTAT) and the FIFO output (TRACEPKT). TFOs are generated whenever trace is first enabled and whenever the instruction synchronization counter reaches zero. Trace FIFO offsets replace the address packet offset (APO) information that was used in previous ETM implementations. Rather than counting branches, TFOs count the number of bytes that are currently in the FIFO. Synchronizing in this manner removes the need for the TRACESYNC pin in the protocol. It also removes the need for starting tracing with a BE PIPESTAT followed by two dead cycles for APO values.

Whenever a TFO is broadcast for synchronization while trace is already enabled, a PIPESTAT value of IE is implied. When TFOs are broadcast to initiate tracing, no PIPESTAT is implied and PIPESTAT for the first traced instruction will be given in the following cycle.

TFOs for synchronization are generated whenever all the following criteria are met:
A cycle counter, typically initialized to 1024, reaches zero
The current instruction has a PIPESTAT value of 'IE'

Once a synchronization request has been indicated, the TFO cycle counter is reset to whatever value has been programmed into the instruction synchronization register (default value is 1024) and begins counting again. In the case where a second synchronization request is made before the first has been serviced, the ETM is forced into overflow as a way to force synchronization to occur. Some trace is lost in this scenario, but this is not thought to be an issue since, if this happens, the processor is most likely stuck in an infinite loop. Therefore, no meaningful trace is lost. The only time this may not be the case is if the synchronization counter is set to some ridiculously low number. Therefore, it is ill advisable to set the synchronization value too low (anything below 50 cycles).

When a TFO cycle occurs, several bytes of data are placed on the FIFO that cycle. This data is referred to as a TFO packet and typically consists of a special header byte, the current CONTEXT ID, and a full instruction address. The proper format for TFO packets is given in section 5.4.

Note that, in the four-bit TRACEPKT configuration, if a TFO occurs when the second nibble of a byte is expected, an extra nibble of value '0x6' is output on TRACEPKT[3:0] immediately following the TFO value. This nibble is required since TFO values specify synchronization in terms of bytes, not nibbles. By outputting this extra nibble, ETM10 guarantees that current top of the FIFO, pointed to by the TFO value, will always be byte aligned. It is important that the decompressor is aware that this extra nibble will appear on TRACEPKT[3:0] for the case where synchronization is not required. The decompressor should always expect this extra nibble whenever a TFO is generated on an odd nibble regardless of whether the TFO is due to synchronization or Trace being enabled. FIFO output is delayed until the complete TFO value (and extra nibble, if required) has been output on TRACEPKT[3:0].

1.21.5 Trigger Status

A trigger status (TR) implies that the real four-bit status for this cycle is placed on TRACEPKT[3:0] and FIFO output is delayed by one cycle. This behavior is identical to ETM7 and EMT9. If a trigger and a TFO want to occur at the same time, the PIPESTAT value on TRACEPKT[3:0] will be TD. This is uniquely identifiable as a true TFO since WT pipestats will never be converted to TD pipestats when a trigger occurs. In the four bit port case, if a trigger wants to occur in the second cycle of a TFO broadcast (or the gap cycle), the trigger will occur and the FIFO output will be delayed by an extra cycle to output the remaining TFO nibble(s). Therefore, triggers are never delayed and are guaranteed to be output immediately when generated.

1.22 Packet Header Encodings

Packets are placed in the FIFO due to a PIPESTAT value with the 'D' encoding. Up to three packets (two data packets and one branch address packet) can be placed in the FIFO in a single cycle. Here are the encodings for packet header values:

| Value | Description |
|---|---|
| CXXXXXX1 | Branch address |
| CTT0SS00 | Load Miss data, TT = tag |
| C0AMSS10 | Normal data, A = First data packet (address expected) |
| C1A1TT00 | Load Miss occurred, TT = tag, A = First data packet |
| C1101010 | Value Not Traced |
| C1101110 | Context ID |
| C10MSS10 | Reserved for full-visibility data tracing |
| C111SS10 | Reserved for auxiliary data |
| C1100X10 | Reserved |
| C0x1xx00 | Reserved |

The C bit on a data header is used to inform the decompression tool how many packets are being inserted into the FIFO in a single cycle. The C bit is asserted for each packet inserted up to but not including the last packet. This is necessary for the decompressor to know which packets should be tied to which cycle, and therefore which instruction. This C bit should not be confused with the address continue bit which is indicated by a lower case 'c'.

1.22.1 Branch Address

Branch addresses are encoded in a similar way to previous ETM implementations. A branch packet can still be one to five bytes long, and the decompression tool should expect more bytes whenever the c bit is enabled. However, bit zero of a branch address is no longer used to differentiate between Thumb and ARM state. Instead, all branch addresses are prefixed, pre-compression, with a one in $33^{rd}$ bit position. Once compressed, all branch addresses are suffixed with a one in the $0^{th}$ bit position. The one in bit zero identifies the packet as a branch address, and the one in bit 33 is used to help distinguish between ARM and thumb addresses. Since ARM addresses must be word aligned, only bits [31:1] of an ARM address are broadcast. Thumb addresses are half-word aligned and therefore need only broadcast bits [31:1]. Broadcasting a different number of bits for ARM and Thumb addresses combined with having the $33^{rd}$ bit always asserted pre-compression guarantees that a full five byte address will be broadcast on a transition between ARM and Thumb state. Furthermore, ARM and Thumb address can always be uniquely identified by the high order bits of the fifth address byte, as shown in the following table:

| ARM 5 byte address | Thumb 5 byte address |
|---|---|
| 1XXXXXX1 | 1XXXXXX1 |
| 1XXXXXXX | 1XXXXXXX |
| 1XXXXXXX | 1XXXXXXX |
| 1XXXXXXX | 1XXXXXXX |
| 0E001XXX | 0E01XXXX |

If present, a branch target address will always be the last item to be placed into the FIFO on a given cycle. Therefore, a packet continuation bit (C bit) is not required. Reasons codes are no longer broadcast on address bits 6:1 in the $5^{th}$ byte since they are now given as part of the TFO packet header, which is discussed in section 5.4. Bit 6 of the $5^{th}$ byte is used to indicate an exception branch address (indicated by an 'E' in the table above). This bit is set on any branch due to an abort, interrupt, or soft reset. This is useful so that the decompressor can recognize, and indicate to the user, that these interrupted instructions were not actually executed. Bit 7 and Bit 5 of the fifth address byte remain reserved for future use.

1.22.2 Normal Data

The normal data header is used for all loads that do not miss in the cache and for store data packets. It is also used for CPRT data packets if CPRT data tracing is enabled. If data address tracing is enabled, the data address will be broadcast after the header packet and before the data value, if present. Data addresses are broadcast using the same compression technique as instruction branch addresses and therefore consist of one to five bytes. As is true for previous ETM implementations, whether or not data addresses are traced must be statically determined before tracing begins. If two normal data packets are given in a single cycle (due to a 64bit data transfer) only the first packet will contain a data address. When data for LSM instructions are broadcast, the data address is only broadcast with the first data packet, even though subsequent data packets will be transferred in different cycles. The 'A bit in the normal data header is used to specify that this is the first data packet for a particular instruction, and therefore a data address should be expected (if address tracing is enabled). Having this information available in the header byte allows the decompressor to maintain synchronisation when tracing through sections of code which are not decompressable (i.e. any region for which a binary is not available). The 'A' bit is not asserted on CPRT packets.

The 'MSS' bits in the normal data encoding are used for data value compression. When the M bit is low, the SS bits specify the size of the data value transferred. Leading zeros are removed from the value as a simple form of data compression. Preliminary experiments show this compression technique yields about 20-30% compression, which is enough to offset the additional bandwidth cost of the header byte. Encodings with the M bit set are reserved for future compression techniques. The exact encodings for the MSS bits are given in the following table:

| Encoding | Description |
| --- | --- |
| 000 | Value == 0, no data bytes follow |
| 001 | Value < 256, one data byte follows |
| 010 | Value < 65536, two data bytes follow |
| 011 | No compression done, four data bytes follow |
| 1xx | Reserved for future compression techniques |

1.22.3 Load Miss

The Load Miss Occurred and Load Miss Data header types handle load requests that miss in the data cache. When a load miss occurs, a Load Miss Occurred packet is placed in the FIFO where the data value is expected. If data address tracing is enabled, the packet will include the data address. Otherwise, the packet will consist of just the Load Miss Occurred header byte. When a Load Miss Occurred packet is read, the decompression software will then know that the data value is now an outstanding miss, and it will be returned later. Once the data is returned, the PIPESTAT value for that cycle will be modified to the '+DATA' version and the Load Miss Data packet, consisting of the Load Miss Data header byte and the actual data value, will be placed in the FIFO. The Load Miss Data packet will never include a data address. Since the load/store unit must have a free cycle to return Load Miss data, this data will never be returned in the same cycle as data for another load or store request.

The 'TT' bits in the Load Miss header types are used as a tag to identify each load miss. The Load Miss Occurred packet will always have the same tag value as it's corresponding Load Miss Data packet. ARM1020E only supports one outstanding Load Miss at a time, but a second load miss packet may be broadcast before data for the first miss is returned. Therefore, to uniquely identify all load misses, tag values 2'b00 and 2'b01 are supported on ETM10 rev 0. Two bits have been allocated to the tag field to support future processors that may allow more outstanding misses. Furthermore, although ARM1020E will always return miss data in order (relative to other load misses), this tagging mechanism will support future processors that may return miss data out-of-order.

When a miss occurs on a 64bit load value, two Load Miss packets are placed in the FIFO in the same cycle. The decompressor will know that these two misses are for a single 64 bit value since both packets will have the same tag value and they will be placed in the FIFO in the same cycle. As with normal data packets, the data address will only be present with the first Load Miss packet, and will not be present at all if the miss occurs in the middle of an LSM that has already broadcast data packets. When Load Miss data is returned for the 64bit case, it is always returned as two separate Load Miss Data packets given in the same cycle. Both packets will have the same miss tag.

Load miss data packets use the MSS bits for size information and data compression as is done for normal data. If the decompressor receives an unexpected Load Miss data packet (i.e. a miss data packet is given without a pending miss occurred packet with the same tag), it should skip over the specified number of bytes given in the size. If trace is disabled before the outstanding miss data is returned then this data item will be placed in the FIFO with a 'DW' PIPESTAT as soon as it's available. If trace is enabled with a reason code of overflow or exited debug, the decompressor should cancel any pending Load Miss packets.

1.22.4 Auxiliary and Full-Visibility Data Tracing

The auxiliary and full-visibility data header encodings are reserved slots set aside for expandability in the protocol. It is possible that these packet types will be used for tracing auxiliary data both internal and external to the processor (Full-Visibility refers to tracing all register file updates). Like other data packets, auxiliary data packets utilise the SS bits for size information. Full-Visibility data tracing supports the M bit for further compression as well. These packet types will not be used on ETM10 rev 0.

1.22.5 Context ID

The Context ID header byte is only used when the Context ID is modified via the Context ID update instruction: MCR c15, 0, rd, c13, c0, 1. The size of the data value is statically determined by the Context ID size specified in the ETM10 control register (register 0x0, bits [15:14]) Only the number of bytes specified will be traced even if the new value is larger than the number of bytes specified. If the size is specified as zero, then Context ID updates will not be traced. Note that even though the Context ID update instruction is an MCR, Context ID value tracing is completely independent from tracing data values from other CPRT instructions. It is not affected by the Monitor CPRT bit in the ETM10 control register (register 0x0, bit [1]). Using a unique header value for Context ID updates allows the decompressor to recognize Context ID changes even when tracing through code regions which are not decompressable (i.e. any region for which a binary is not available).

1.22.6 Value Not Traced

Previous ETM implementations have only been able to trace either all or none of the data values for an LSM operation, and this decision has been made at the time of the first transfer. Since today's compilers will often combine adjacent LDR/STR operations into an LSM unbeknownst to the user, this behaviour is undesirable. With the addition of Value Not Traced packets, we have added the ability to partially trace an LSM and only output the data values that exactly match the trigger criteria.

Whenever the first data value associated with an LSM is traced, a normal data packet is placed in the FIFO containing the data address (if address tracing is enabled) and the data value (if data value tracing is enabled). All subsequent data transfers for this LSM will result in a packet being placed in the FIFO. If subsequent values are traced, then a normal data packet, giving the data value only, will be traced. If subsequent data transfers should not be traced, then Value Not Traced packets will be placed on the FIFO for these transfers. Value Not Traced packets consist of only the Value Not Traced header byte. The decompression software can then use the Value Not Traced packets in combination with the normal data packets to determine which LSM values were traced and which were not by working backwards from the final data transfer. Note that, as stated earlier, once tracing begins on a LSM instruction, it will continue until the LSM completes, even if TraceEnable is deasserted before the instruction completes.

1.22.7 Reserved

There are a total of ten reserved slots remaining in the data header encodings. All of these slots are made available for enhancements to the protocol as required and/or for use by future ETM implementations. The M bit in the Normal Data and Full-Visibility Trace encodings could also be used for new data header encodings instead of compression if even more header types are required by future ETM implementations.

1.23 TFO Packet Header Encodings

TFO packets are placed in the FIFO by a TFO cycle (described in Section 5.2.4). Since the decompressor will know when a packet is placed in the FIFO by a TFO, TFO packets have their own header byte encodings, which are completely independent from the encoding space used by PIPESTAT data packets. Here are the TFO packet header encodings:

| Value | Description |
| --- | --- |
| XXXXXX00 | ARM Instruction address |
| XXXXXXX1 | Thumb Instruction address |
| 0RR00010 | Normal TFO packet |
| 1RR00010 | LSM in progress TFO packet |
| XXXXX110 | Reserved |
| XXXX1010 | Reserved |
| XXX10010 | Reserved |

1.23.1 Instruction Address

If TRACEPKT[1:0]!=2'b10 for the first byte of a TFO packet, then this TFO packet consists of just an instruction address. Since a full address is always required, no compression is attempted and the address is always output as a four-byte value. Bit 0 of the address specifies whether it is a Thumb or an ARM instruction address. When a TFO packet consist of just the instruction address, this implies:
 CONTEXT ID values are not traced (determined by ContextIDSize, ETM Control register bits [15:14])
 The TFO reason code is 2'b00, normal synchronization If the reason code is non-zero or a CONTEXT ID value is being traced, then one of the following TFO packets is required. TFO packets consisting of just an address are not strictly required for protocol compliance and will not be implemented on ETM10 rev 0.

1.23.2 Normal TFO Packet

Normal TFO packets consist of a header byte followed by 0 to 4 bytes of CONTEXT ID, followed by a 4-byte instruction address. The number of CONTEXT ID bytes traced is statically determined by ETM Control register bits [15:14]. The instruction address is always four bytes and is not compressed. Bit 0 specifies the Thumb bit. The TFO header byte contains the two-bit reason code (labeled as RR in the table above). These reason codes are consistent with the ones used by ETM7 and ETM9 in protocol versions 0 and 1. The reason codes are given in the following table:

| Value | Description |
| --- | --- |
| 00 | Normal synchronization |
| 01 | Tracing has been enabled |
| 10 | Trace restarted after overflow |
| 11 | ARM has exited from debug state |

1.23.3 LSM in Progress TFO Packet

LSM in Progress packets occur only when trace is enabled in the middle of a multiple memory access instruction (LDM, STM, LDC, or STC), and another instruction is currently executing. These packets consist of a header byte followed by 0 to 4 bytes of CONTEXT ID, followed by a 4 byte instruction address for the LSM, followed by 1 to 5 bytes of compressed address for the instruction currently executing. The LSM instruction is a fixed four-byte address with bit 0 specifying the Thumb bit. The current instruction address is compressed using the same technique as branch addresses. (as specified in section 5.3.1) The final instruction address is compressed relative to the full address from the LSM instruction. The next instruction PIPESTAT will be for the instruction pointed to by the second address and tracing begins in the normal way from this point forwards. This packet type is necessary for properly tracing all instructions that touch a particular data address or data value. Without it, the LSM instruction could not be properly traced based on the data address. Note that instructions occurring underneath the LSM are traced, even if tracing was programmed to turn on only during the LSM itself. Similarly, if tracing is turned on due to the instruction address of an instruction that just happens to execute underneath an LSM, a LSM in Progress TFO packet will still be output. For further clarity of the differences between the Normal TFO packet and the LSM in Progress TFO packet, the following table expresses the bytes that should be expected for each case:

| Normal TFO Packet | | LSM in Progress TFO Packet | |
| --- | --- | --- | --- |
| Normal Header | (1 byte) | LSM in Progress header | (1 byte) |
| Context ID | (0–4 bytes) | Context I | (0–4 bytes) |
| Instruction Address | (4 bytes) | LSM Address | (4 bytes) |
| N/A | | Instruction Address | (0–5 bytes) |

ARM10 TRACE Interface

This section describes the signal interface between ARM1020E and ETM10. The majority of the interface is driven by ARM1020E into ETM10. Signal descriptions are divided into custom datapath inputs, synthesised control inputs, and ETM outputs. Synthesised control signals can be changed later, but datapath signal changes require custom logic rework and, therefore, these cannot be changed late in the design. All input signals are registered immediately inside ETM10 and all outputs are driven directly from the output of a register. The interface consists of a total of 220 signals, which includes 213 inputs and 4 outputs from an ETM10 perspective.

1.24 ETM Datapath Inputs

There are four data buses of interest for ETM data tracing: load data, store data, MCR data, and MRC data. All four of these buses are 64 bits in width. Since it is only possible for one of these buses to contain valid data in any given cycle, all four buses are muxed down within ARM1020E to one 64bit data bus, ETMDATA. ETMDATA is registered within ARM1020E before it is driven to the ETM. ETMDATA is valid in the write (WR) stage of the ARM1020E pipeline. There are four address buses driven from ARM1020E to ETM10. Three of these buses are for instruction addresses and one is for data addresses. The R15 buses are driven to ETM in the execute (EX) stage of the ARM1020E pipeline while the IA and DA address buses are valid in the memory (ME) stage. All datapath buses driven to ETM are given in the following table.

| Signal name | Description |
| --- | --- |
| ETMDATA[63:0] | Contains the data value for a Load, Store, MRC, or MCR instruction |
| DA[31:0] | Data address bus. Gives the address for every load or store transaction |

-continued

| Signal name | Description |
|---|---|
| IA[31:1] | Instruction address bus. Gives the address for every instruction fetch. |
| R15BP[31:1] | Address for the branch phantom currently in execute |
| R15EX[31:1] | Address for the instruction currently in execute |

1.25 ETM Control inputs

1.25.1 ETMCORECTL[23:0]

ETMCORECTL includes a wide variety of control signals that all come from the ARM10 core. These signals are all registered within the core and combined onto this common bus before they are driven to ETM10. The control signals present on this bus and their meaning is given in the following table. All of these are valid in the write stage (WR) of the ARM1020E pipeline, unless specified otherwise.

| Signal name | Description | Qualified by |
|---|---|---|
| ForcePF | Current address on the IA bus is a target for an indirect branch | None |
| ITBit | Thumb Bit for current instruction fetch (valid in ME) | IMnREQ/ForcePF |
| InMREQ | Current address on the IA bus is for a valid instruction fetch | None |
| UpdatesCONTEXTID | Current instruction is updating the CONTEXT ID. | InstValid |
| R15Hold | Stall signal for the address given on R15EX. | None |
| BpValid | When asserted, a branch phantom is present in execute | None |
| BpCCFail | Branch phantom failed it's condition codes | BpValid |
| InstValid | Asserted once per executed instruction. Takes into account mispredicted branches | None |
| CCFail | Current instruction failed it's condition codes | InstValid |
| LSCMInit | Current instruction is a LSM instruction | InstValid |
| Exception | Current instruction is an exception (interrupt, reset, or abort) | InstValid |
| ETMBranch | Last instruction executed is an indirect branch | Asserted before or coincident ForcePF |
| TbitEx | Asserted when ARM1020E is in thumb state (valid in ME) | InstValid |
| PreLoad | Current instruction is a preload and should not be traced | InstValid |
| DnMREQ | Qualifies the Data Address bus, DA | None |
| DMAS[1:0] | Load or store data size | DnMREQ |
| ETMSwap | Indicates a 64bit store to a big endian memory device. | DnMREQ |
| DnRW | data request read/write signal (0 == read) | DnRW |
| HUMACK | Valid load miss data is present on the data bus this cycle | None |
| LSCM | LSM is in progress in the Load/Store Unit | DnMREQ |
| DABORT | Data request aborted | DnMREQ |
| MISSCNT[1:0] | How many load misses are outstanding. | None, transitions indicate new miss |

1.25.2 ETMDATAVALID[1:0]

This signal qualifies the data driven on the bus ETMDATA[63:0]. There is one bit for each half of the data bus.

1.26 ETM Outputs

This section describes the outputs that feed back into ARM1020E and what is required from ARM1020E

1.26.1 FIFOFULL

When enable, the ETM output FIFOFULL is asserted whenever there are bytes placed in the FIFO, and it remains asserted until the FIFO is empty. This behaviour is slightly different from ETM7/9, which waited until the FIFO reached a certain specified level before asserting FIFOFULL (see section 4.16) FIFOFULL is used by the core, in this case ARM1020E, to stall the ARM pipeline. This prevents ETM overflow, thus guarantees a complete trace with the side effect of changing slightly the timing of events happening in the core. Note that due to timing considerations, the assertion of FIFOFULL will not result in the immediate stalling of ARM1020E. Therefore, it is sometimes possible, though rare, to still have an overflow even when FIFOFULL is asserted. When this happens, the number of instructions missed will be small since the processor will remained stalled (due to FIFOFULL assertion) while the FIFO is draining.

1.26.2 PWRDOWN

When HIGH this indicates that the ETM is not currently enabled, so the CLK input can be stopped. This is used to reduce power consumption when trace is not being used. At reset PWRDOWN will be asserted until the ETM10 has been programmed. The ARM10200 testchip should use the PWRDOWN output directly to gate the ETM10 CLK input. As previously noted, PWRDOWN will be temporarily disabled on a CONTEXT ID update to allow for an update on ETM10's internal CONTEXT ID shadow register. Except for the CONTEXT ID update case, PWRDOWN is changed synchronously to TCLK and will be cleared by the ARM debug tools at the start of a debug session. Since PWRDOWN changes many cycles before trace is enabled, using a TCLK based signal to gate the ETM10 CLK does not cause any metastablilty problems.

1.26.3 DBGRQ

Like previous ETM implementations, ETM10 can be programmed to assert DBGRQ whenever the trigger condition occurs. DGBRQ will remain asserted until DGBACK is observed. DBGRQ should be connected to the ARM1020E external debug request pin, EDBGRQ. No extra support from ARM1020E is required for this ETM output. If the EDBGRQ input is already in use by some other functional block in the ASIC, the multiple DGBRQ signals can be ORed together. Note that enabling debug in this manner is not guaranteed to fall on any particular instruction boundary. Furthermore, the core only recognizes EDGBRQ if ARM10 is currently in hardware debug mode.

1.26.4 TDO

ETM10 uses the same TAP interface wiring as previous ETM versions. The TDO pin is connected to the ARM1020E scan expansion input SDOUTBS. ETM10 registers are accessed via scan chain 6 and are programmed in a manner identical to previous ETM implementations. No extra support from ARM1020E is required for this ETM output.

Configurations

ETM7/9 have been made available in small, medium, and large configurations. Medium and large configurations offer more trigger hardware resources and increased FIFO depth at the cost of additional area. Different configurations can be chosen for different ASIC applications by simply resynthesising the soft macro with the new configuration. ETM10 will offer a similar range of configurations. The following table presents the configurations currently proposed for ETM10. Most trigger resources are identical to ETM7 and ETM9 with the exception of data comparators in the large configuration which was decreased from 8 to 4due to the larger size of the 64bit comparators. Increased FIFO sizes in each configuration reflect the need to support the higher instruction throughput (i.e. performance) of ARM1020E. FIFO sizes for each configuration may increase based on area impact and feedback from performance modelling. The gate counts given for ETM10 configurations are estimates based on the initial synthesis of the ETM10 rtl model. These estimated gate counts are likely to be different than what is achieved in the final implementation. A large size ETM10 is what will be placed on the ARM10200 testchip. The corresponding number of resources for ETM9 in each category is given in parentheses for comparison.

| Resource type | Small ETM10 (ETM9) | Medium ETM10 (ETM9) | Large ETM10 (ETM9) |
|---|---|---|---|
| Pairs of address comparators | 1 (1) | 4 (4) | 8 (8) |
| Data comparators | 0 (0) | 2 (2) | 4 (8) |
| Memory map decoders | 0 (4) | 0 (8) | 0 (16) |
| CONTEXT ID comparators | 0 (0) | 1 (0) | 3 (0) |
| Sequencers | 0 (0) | 1 (1) | 1 (1) |
| Counters | 1 (1) | 2 (2) | 4 (4) |
| External inputs | 2 (2) | 4 (4) | 4 (4) |
| External outputs | 0 (0) | 1 (1) | 4 (4) |
| FIFO depth | 15 (9) | 30 (18) | 60 (45) |
| Trace packet width | 4/8/16 (4/8) | 4/8/16 (4/8/16) | 4/8/16 (4/8/16) |
| Approximate Gate count | 35k (25k) | 50k (35k) | 75k (60k) |
| Approximate Area (0.25 process) | 1.8 mm$^2$ (1.1 mm$^2$) | 2.3 mm$^2$ (1.58 mm$^2$) | 4.7 mm$^2$ (3.1 mm$^2$) |
| Approximate Area (0.18 process) | 1.0 mm$^2$ (0.62 mm$^2$) | 1.26 mm$^2$ (0.9 mm$^2$) | 2.5 mm$^2$ (1.7 mm$^2$) |

Although a particular embodiment has been described herein, it will be apparent that the invention is not limited thereto, and that many modifications and additions thereto may be made within the scope of the invention. For example, various combinations of the features of the following dependent claims can be made with the features of the independent claims without departing from the scope of the present invention.

I claim
1. An apparatus for processing data, said apparatus comprising:
   a processing circuit for executing processing instructions from any of a plurality of instruction sets of processing instructions, each processing instruction being specified by an instruction address identifying that processing instruction's location in memory, the instruction address having a predetermined number of bits irrespective of the instruction set to which the associated processing instruction belongs, but a different number of most significant instruction address bits needing to be specified in the instruction address to uniquely idenfity processing instructions in different instruction sets; and encoding logic for encoding at least one instruction address with an indication of the instruction set corresponding to that instruction to generate an n-bit encoded instruction address, the encoding logic being arranged to perform the encoding by performing a computation equivalent to removing any least significant bits not forming the instruction address bits needing to be specified, and extending the specified instruction address bits to n-bits by prepending a pattern of bits to the specified instruction address bits, the number of least significant bits removed and the pattern of bits prepended being dependent on the instruction set corresponding to that instruction.

2. The apparatus as claimed in claim 1, wherein for each instruction set a first pattern of bits prepended to the specified instruction address bits of an instruction address from that instruction set is related to a second pattern of bits prepended to the specified instruction address bits of instruction addresses of different instruction sets by shifting the first pattern of bits..

3. The apparatus as claimed in claim 1, wherein the encoding logic is arranged to perform the encoding by performing a computation equivalent to generating an intermediate value by pre-pending a predetermined pattern of bits to the specified instruction address bits of the instruction address and then selecting as the encoded instruction address n bits from the intermediate value.

4. The apparatus as claimed in claim 1, further comprising compression logic for compressing a said encoded instruction address by performing a computation equivalent to partitioning that encoded instruction address into a plurality of x-bit sections, comparing each x-bit section with the corresponding x-bit section of a preceding encoded instruction address and outputting as a compressed encoded instruction address the most significant x-bit section that differs from the corresponding x-bit section of the preceding encoded instruction address, along with any less significant x-bit sections.

5. The apparatus as claimed in claim 4, wherein the compression logic is arranged to associate with each x-bit section to be output from the compression logic a flag to indicate whether that x-bit section is the last x-bit section being output as the compressed encoded instruction address.

6. The apparatus as claimed in claim 5, wherein if a plurality of x-bit sections are to be output from the compression logic, the plurality of x-bit sections are output sequentially starting with the least significant x-bit section.

7. The apparatus as claimed in claim 5, wherein the compression logic is further arranged to expand to y bits each x-bit section to be output from the compression logic, with the most significant y-x bits containing the flag.

8. The apparatus as claimed in claim 7, wherein the flag is a single bit.

9. The apparatus as claimed in claim 8, wherein y is 8 and x is 7.

10. The apparatus as claimed in claim 1, wherein the encoding logic comprises an n-bit selector logic unit for receiving the intermediate value and an identifier signal identifying the instruction set associated with the instruction address contained within the intermediate value, the n-bit selector being arranged to output a predetermined n-bits of the intermediate value dependent on the identifier signal.

11. The apparatus as claimed in claim 4, wherein the compression logic comprises a plurality of comparators, each comparator being arranged to receive a corresponding x-bit section of the encoded instruction address, and including temporary storage for storing the corresponding x-bit section of the preceding encoded instruction address, the comparator being arranged to compare the two x-bit sections and to generate a difference signal which is set when the two x-bit sections are different.

12. The apparatus as claimed in claim 11, wherein the compression logic further comprises a flag generator logic arranged to generate for each x-bit section to be output from the compression logic a flag based on predetermined combinations of the difference signals generated by the plurality of comparators, such that a flag for a particular x-bit section is set if a more significant x-bit section is also to be output.

13. The apparatus as claimed in claim 12, wherein the compression logic further comprises an output generator for generating the compressed encoded instruction address by pre-pending to each x-bit section to be output its corresponding flag, thereby generating as the output compressed encoded instruction address a sequence of y-bit sections.

14. The apparatus as claimed in claim 4, wherein the encoding logic and compression logic are provided within a trace module used to trace activities of the processing circuit.

15. A tracing tool for a data processing apparatus, the data processing apparatus having a processing circuit for executing processing instructions from any of a plurality of instruction sets of processing instructions, each processing instruction being specified by an instruction address identifying that processing instruction's location in memory, the instruction address having a predetermined number of bits irrespective of the instruction set to which the associated processing instruction belongs, but a different number of most significant instruction address bits needing to be specified in the instruction address to uniquely identify processing instructions in different instruction sets, and the tracing tool comprising:

encoding logic for encoding at least one instruction address with an indication of the instruction set corresponding to that instruction to generate an n-bit encoded instruction address, the encoding logic being arranged to perform the encoding by performing a computation equivalent to removing any least significant bits not forming the instruction address bits needing to be specified, and extending the specified instruction address bits to n-bits by prepending a pattern of bits to the specified instruction address bits, the number of least significant bits removed and the pattern of bits prepended being dependent on the instruction set corresponding to that instruction.

16. The tracing tool as claimed in claim 15, further comprising compression logic for compressing an encoded instruction address by performing a computation equivalent to partitioning the encoded instruction address into a plurality of x-bit sections, comparing each x-bit section with the corresponding x-bit section of a preceding encoded instruction address and outputting as the compressed encoded instruction address the most significant x-bit section that differs from the corresponding x-bit section of the preceding encoded instruction address, along with any less significant x-bit sections.

17. A method of storing instruction set information, a processing circuit being arranged to execute processing instructions from any of a plurality of instruction sets of processing instructions, each processing instruction being specified by an instruction address identifying that processing instruction's location in memory, the instruction address having a predetermined number of bits irrespective of the instruction set to which the associated processing instruction belongs, but a different number of most significant instruction address bits needing to be specified in the instruction address to uniquely identify processing instructions in different instruction sets, the method comprising the steps of:

encoding logic encoding at least one instruction address with an indication of the instruction set corresponding to that instruction to generate an n-bit encoded instruction address, by performing a computation equivalent to:

the encoding logic removing any least significant bits not forming the instruction address bits needing to be specified, and the encoding logic extending the specified instruction address bits to n-bits by prepending a pattern of bits to the specified instruction address bits, the number of least significant bits removed and the pattern of bits prepended being dependent on the instruction set corresponding to that instruction.

18. The method as claimed in claim 17, further comprising the step of compressing a said encoded instruction address by performing a computation equivalent to:

partitioning the encoded instruction address into a plurality of x-bit sections;

comparing each x-bit section with the corresponding x-bit section of a preceding encoded instruction address; and outputting as the compressed encoded instruction address the most significant x-bit section that differs from the corresponding x-bit section of the preceding encoded instruction address, along with any less significant x-bit sections.

19. The method as claimed in claim 18, further comprising decompressing the compressed encoded instruction address by performing a computation equivalent to:

(i) determining the number of x-bit sections forming the compressed encoded instruction address; and (ii) extending as necessary the compressed encoded instruction address to n-bits by incorporating additional x-bit sections obtained from corresponding x-bit sections of a preceding encoded instruction address, thereby producing the encoded instruction address.

20. The method as claimed in claim 19, further comprising the step of decoding the encoded instruction address by performing a computation equivalent to determining from the predetermined pattern of bits the instruction set to which the instruction address relates, and removing the predetermined pattern of bits to yield the specified instruction address bits.

21. A computer readable medium carrying a computer program for controlling an apparatus in accordance with the method of claim 17.

22. The apparatus as claimed in claim 1, wherein the encoding logic is provided within a trace module used to trace activities of the processing circuit.

* * * * *